US012604225B2

(12) United States Patent
Ibrahim et al.

(10) Patent No.: US 12,604,225 B2
(45) Date of Patent: Apr. 14, 2026

(54) CHANNEL ESTIMATION FOR FULL-DUPLEX AND HALF-DUPLEX SLOTS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 18/315,389

(22) Filed: May 10, 2023

(65) Prior Publication Data

US 2024/0381134 A1 Nov. 14, 2024

(51) Int. Cl.
*H04W 24/10* (2009.01)
*H04L 5/16* (2006.01)
*H04W 24/08* (2009.01)

(52) U.S. Cl.
CPC ............... *H04W 24/08* (2013.01); *H04L 5/16* (2013.01); *H04W 24/10* (2013.01)

(58) Field of Classification Search
CPC ....... H04L 5/0051; H04L 5/0057; H04L 5/14; H04L 5/16; H04W 24/08; H04W 24/10; H04W 72/04; H04W 72/0453; H04W 72/21
See application file for complete search history.

(56) References Cited

U.S. PATENT DOCUMENTS

| | | | | | |
|---|---|---|---|---|---|
| 10,361,757 | B2 * | 7/2019 | Park | .................... | H04W 72/21 |
| 2019/0229780 | A1 * | 7/2019 | Kim | .................... | H04B 7/0643 |
| 2019/0281487 | A1 * | 9/2019 | Liu | .................... | H04L 5/0057 |
| 2022/0361195 | A1 * | 11/2022 | Sun | .................... | H04L 5/0051 |
| 2023/0023237 | A1 * | 1/2023 | Han | .................... | H04W 24/08 |
| 2025/0038906 | A1 * | 1/2025 | Park | .................... | H04W 24/10 |
| 2025/0062886 | A1 * | 2/2025 | You | .................... | H04W 72/04 |
| 2025/0105895 | A1 * | 3/2025 | You | .................... | H04L 5/14 |
| 2025/0183970 | A1 * | 6/2025 | Ma | .................... | H04W 72/0453 |
| 2025/0184070 | A1 * | 6/2025 | Ma | .................... | H04L 5/0051 |
| 2025/0203428 | A1 * | 6/2025 | Fan | .................... | H04B 7/0691 |

* cited by examiner

*Primary Examiner* — Michael Thier
*Assistant Examiner* — Prince A Mensah
(74) *Attorney, Agent, or Firm* — Holland & Hart LLP

(57) ABSTRACT

Methods, systems, and devices for wireless communication are described. A user equipment (UE) may receive a control message that indicates a first resource for a first channel state information (CSI) reference signal (CSI-RS) and a second resource for a second CSI-RS, where the first resource may be associated with first CSI for half-duplex operations and the second resource may be associated with second CSI for full-duplex operations. The UE may receive at least one of the first CSI-RS or the second CSI-RS and measure at least one of the first CSI-RS or the second CSI-RS to obtain first CSI for the half-duplex operations and second CSI for the full-duplex operations. In response to obtaining the first CSI and the second CSI, the UE may transmit at least one measurement report that includes the first CSI and the second CSI.

30 Claims, 16 Drawing Sheets

300

300

301

130

105

115

Network
Entity

Transceiver

1210

Antenna

1215

Communications
Manager

1220

Memory

Code

1230

1225

1240

Processor

1235

1205

1200

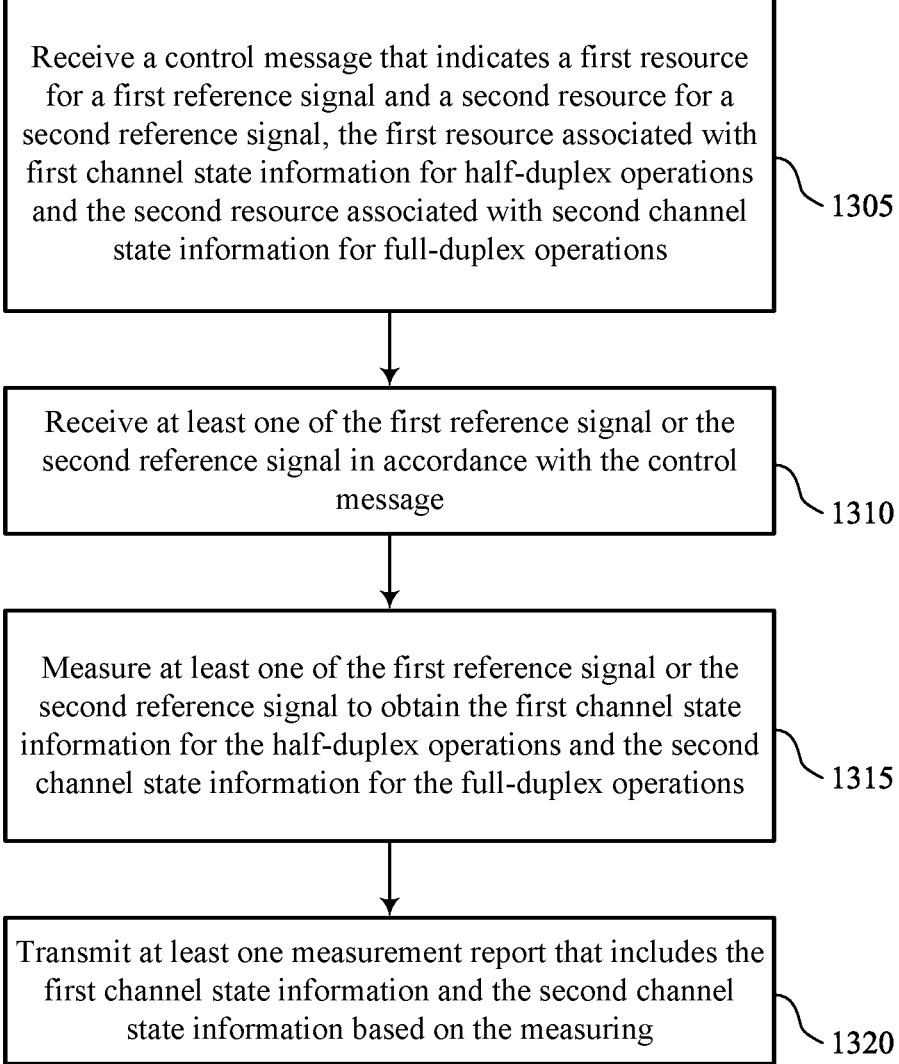

Receive a control message that indicates a first resource for a first reference signal and a second resource for a second reference signal, the first resource associated with first channel state information for half-duplex operations and the second resource associated with second channel state information for full-duplex operations

1305

Receive at least one of the first reference signal or the second reference signal in accordance with the control message

1310

Measure at least one of the first reference signal or the second reference signal to obtain the first channel state information for the half-duplex operations and the second channel state information for the full-duplex operations

1315

Transmit at least one measurement report that includes the first channel state information and the second channel state information based on the measuring

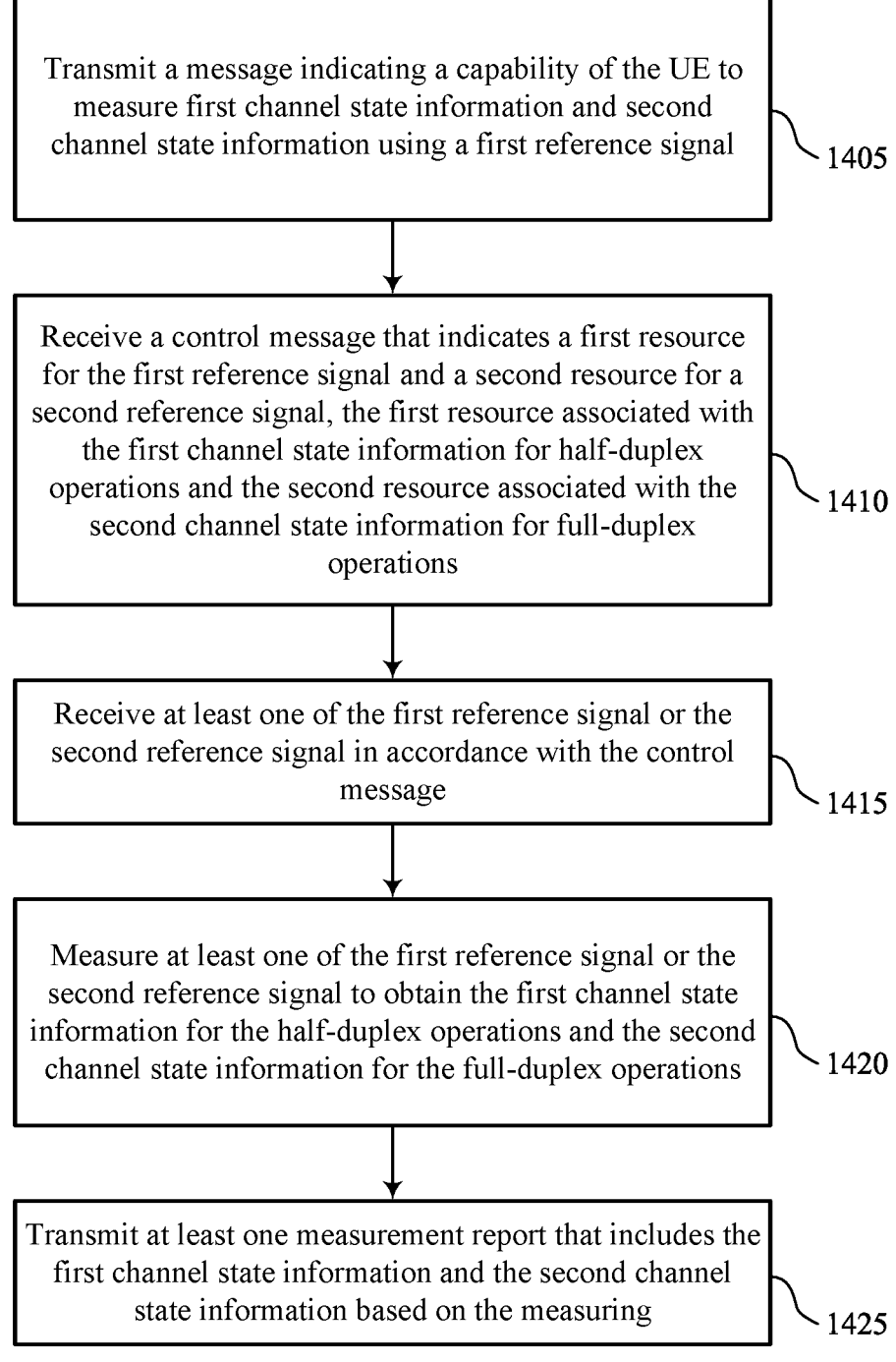

Transmit a message indicating a capability of the UE to measure first channel state information and second channel state information using a first reference signal

1405

Receive a control message that indicates a first resource for the first reference signal and a second resource for a second reference signal, the first resource associated with the first channel state information for half-duplex operations and the second resource associated with the second channel state information for full-duplex operations

1410

Receive at least one of the first reference signal or the second reference signal in accordance with the control message

1415

Measure at least one of the first reference signal or the second reference signal to obtain the first channel state information for the half-duplex operations and the second channel state information for the full-duplex operations

1420

Transmit at least one measurement report that includes the first channel state information and the second channel state information based on the measuring

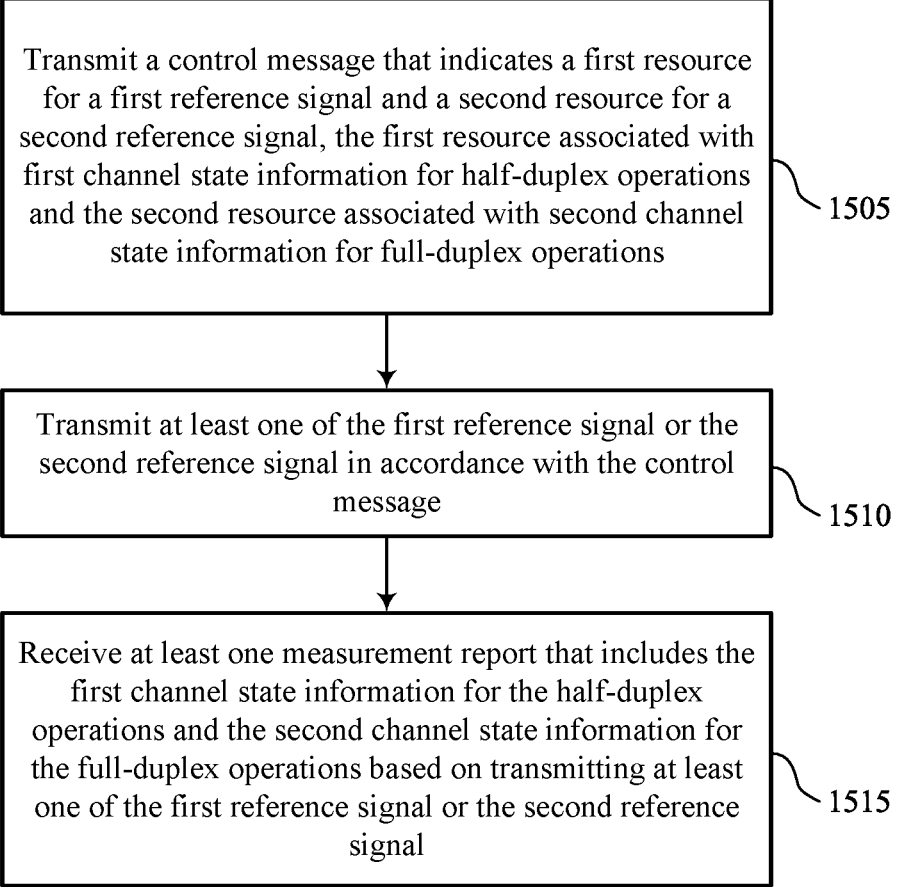

Transmit a control message that indicates a first resource for a first reference signal and a second resource for a second reference signal, the first resource associated with first channel state information for half-duplex operations and the second resource associated with second channel state information for full-duplex operations

1505

Transmit at least one of the first reference signal or the second reference signal in accordance with the control message

1510

Receive at least one measurement report that includes the first channel state information for the half-duplex operations and the second channel state information for the full-duplex operations based on transmitting at least one of the first reference signal or the second reference signal

CHANNEL ESTIMATION FOR FULL-DUPLEX AND HALF-DUPLEX SLOTS

FIELD OF TECHNOLOGY

The following relates to wireless communications, including channel estimation for full-duplex and half-duplex slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support channel estimation for full-duplex and half-duplex slots. For example, the described techniques provide for a user equipment (UE) to obtain both first channel state information (CSI) for full-duplex operations and second CSI for half-duplex operations based on a common, or single, CSI reference signal (CSI-RS), thereby reducing overhead at the UE and improving coordination between the UE and a network entity.

A method for wireless communications at a UE is described. The method may include receiving a control message that indicates a first resource for a first reference signal and a second resource for a second reference signal, the first resource associated with a half-duplex slot type and the second resource associated with a full-duplex slot type, receiving at least one of the first reference signal or the second reference signal in accordance with the control message, measuring at least one of the first reference signal or the second reference signal to obtain first CSI for the half-duplex slot type and second CSI for the full-duplex slot type, and transmitting at least one measurement report that includes the first CSI and the second CSI based on the measuring.

An apparatus for wireless communications at a UE is described. The apparatus may include a processor, memory coupled with the processor, and instructions stored in the memory. The instructions may be executable by the processor to cause the apparatus to receive a control message that indicates a first resource for a first reference signal and a second resource for a second reference signal, the first resource associated with a half-duplex slot type and the second resource associated with a full-duplex slot type, receive at least one of the first reference signal or the second reference signal in accordance with the control message, measure at least one of the first reference signal or the second reference signal to obtain first CSI for the half-duplex slot type and second CSI for the full-duplex slot type, and transmit at least one measurement report that includes the first CSI and the second CSI based on the measuring.

Another apparatus for wireless communications at a UE is described. The apparatus may include means for receiving a control message that indicates a first resource for a first reference signal and a second resource for a second reference signal, the first resource associated with a half-duplex slot type and the second resource associated with a full-duplex slot type, means for receiving at least one of the first reference signal or the second reference signal in accordance with the control message, means for measuring at least one of the first reference signal or the second reference signal to obtain first CSI for the half-duplex slot type and second CSI for the full-duplex slot type, and means for transmitting at least one measurement report that includes the first CSI and the second CSI based on the measuring.

A non-transitory computer-readable medium storing code for wireless communications at a UE is described. The code may include instructions executable by a processor to receive a control message that indicates a first resource for a first reference signal and a second resource for a second reference signal, the first resource associated with a half-duplex slot type and the second resource associated with a full-duplex slot type, receive at least one of the first reference signal or the second reference signal in accordance with the control message, measure at least one of the first reference signal or the second reference signal to obtain first CSI for the half-duplex slot type and second CSI for the full-duplex slot type, and transmit at least one measurement report that includes the first CSI and the second CSI based on the measuring.

In some examples of the method, apparatuses, and non-transitory computer-readable medium described herein, receiving the control message may include operations, features, means, or instructions for receiving a first measurement configuration for the first resource and a second measurement configuration for the second resource, where receiving at least one of the first reference signal or the second reference signal may be based on the first measurement configuration, the second measurement configuration, or both.

In some examples of the method, apparatuses, and non-transitory computer-readable medium described herein, receiving the control message may include operations, features, means, or instructions for receiving a measurement configuration that indicates a first resource set and a second resource set, the first resource set including the first resource and the second resource set including the second resource, where receiving at least one of the first reference signal or the second reference signal may be based on the measurement configuration.

In some examples of the method, apparatuses, and non-transitory computer-readable medium described herein, the measurement configuration includes an information element indicating a correspondence between the first resource set and the second resource set.

In some examples of the method, apparatuses, and non-transitory computer-readable medium described herein, receiving the control message may include operations, features, means, or instructions for receiving a measurement configuration that indicates a first resource set, the first resource set including the first resource and the second resource, where receiving at least one of the first reference signal or the second reference signal may be based on the measurement configuration.

Some examples of the method, apparatuses, and non-transitory computer-readable medium described herein may further include operations, features, means, or instructions for transmitting a message indicating a capability of the UE to measure the first CSI and the second CSI using the first reference signal, where receiving the control message may be based on the capability.

In some examples of the method, apparatuses, and non-transitory computer-readable medium described herein, the message further indicates a threshold quantity of active reference signals supported at the UE, a threshold quantity of active antenna ports supported at the UE, or a combination thereof.

In some examples of the method, apparatuses, and non-transitory computer-readable medium described herein, transmitting the at least one measurement report may include operations, features, means, or instructions for transmitting a first measurement report that includes the first CSI and transmitting a second measurement report that includes the second CSI.

In some examples of the method, apparatuses, and non-transitory computer-readable medium described herein, transmitting the at least one measurement report may include operations, features, means, or instructions for transmitting a single measurement report that includes the first CSI and the second CSI.

In some examples of the method, apparatuses, and non-transitory computer-readable medium described herein, measuring at least one of the first reference signal or the second reference signal may include operations, features, means, or instructions for measuring the first reference signal to obtain the first CSI for the half-duplex slot type and the second CSI for the full-duplex slot type.

In some examples of the method, apparatuses, and non-transitory computer-readable medium described herein, measuring at least one of the first reference signal or the second reference signal may include operations, features, means, or instructions for measuring the first reference signal to obtain the first CSI for the half-duplex slot type and measuring the second reference signal to obtain the second CSI for the full-duplex slot type.

In some examples of the method, apparatuses, and non-transitory computer-readable medium described herein, receiving the control message may include operations, features, means, or instructions for receiving, for the first resource, an indication of a first quantity of antenna ports, a first scrambling identifier (ID), a first code division multiplexing (CDM) type a first set of power control offsets, a first transmission configuration indication (TCI) state, a first periodicity and offset, a first density, or a combination thereof and receiving, for the second resource, an indication of a second quantity of antenna ports, a second scrambling ID, a second CDM type a second set of power control offsets, a second TCI state, a second periodicity and offset, a second density, or a combination thereof.

In some examples of the method, apparatuses, and non-transitory computer-readable medium described herein, the measuring may be based on the second quantity of antenna ports being a subset of the first quantity of antenna ports.

In some examples of the method, apparatuses, and non-transitory computer-readable medium described herein, the measuring may be based on the second quantity of antenna ports being equivalent to the first quantity of antenna ports and the first set of power control offsets being greater than the second set of power control offsets.

In some examples of the method, apparatuses, and non-transitory computer-readable medium described herein, the measuring may be based on the first scrambling ID being equivalent to the second scrambling ID.

In some examples of the method, apparatuses, and non-transitory computer-readable medium described herein, the measuring may be based on the first CDM type being equivalent to the second CDM type.

In some examples of the method, apparatuses, and non-transitory computer-readable medium described herein, the measuring may be based on the first set of power control offsets being equivalent to the second set of power control offsets.

In some examples of the method, apparatuses, and non-transitory computer-readable medium described herein, the measuring may be based on the first TCI state being different from the second TCI state.

In some examples of the method, apparatuses, and non-transitory computer-readable medium described herein, the measuring may be based on the first periodicity and offset being different from the second periodicity and offset.

In some examples of the method, apparatuses, and non-transitory computer-readable medium described herein, the measuring may be based on the first density being different from the second density.

In some examples of the method, apparatuses, and non-transitory computer-readable medium described herein, the measuring may be based on a second CDM group of the second resource being a subset of a first CDM group of the first resource.

In some examples of the method, apparatuses, and non-transitory computer-readable medium described herein, the measuring may be based on one or more first time symbols and one or more first resource elements of the first resource being equivalent to one or more second time symbols and one or more second resource elements of the second resource.

In some examples of the method, apparatuses, and non-transitory computer-readable medium described herein, the measuring may be based on one or more first time symbols of the first resource being different from one or more second time symbols of the second resource, the one or more first time symbols and the one or more second time symbols being in a same transmission slot.

In some examples of the method, apparatuses, and non-transitory computer-readable medium described herein, the measuring may be based on a first transmission time slot of the first resource being adjacent to a second transmission time slot of the second resource.

A method for wireless communications at a network entity is described. The method may include transmitting a control message that indicates a first resource for a first reference signal and a second resource for a second reference signal, the first resource associated with a half-duplex slot type and the second resource associated with a full-duplex slot type, transmitting at least one of the first reference signal or the second reference signal in accordance with the control message, and receiving at least one measurement report that includes first CSI for the half-duplex slot type and second CSI for the full-duplex slot type based on transmitting at least one of the first reference signal or the second reference signal.

An apparatus for wireless communications at a network entity is described. The apparatus may include a processor, memory coupled with the processor, and instructions stored in the memory. The instructions may be executable by the processor to cause the apparatus to transmit a control message that indicates a first resource for a first reference signal and a second resource for a second reference signal, the first resource associated with a half-duplex slot type and the second resource associated with a full-duplex slot type, transmit at least one of the first reference signal or the second reference signal in accordance with the control message, and receive at least one measurement report that includes first CSI for the half-duplex slot type and second CSI for the full-duplex slot type based on transmitting at least one of the first reference signal or the second reference signal.

Another apparatus for wireless communications at a network entity is described. The apparatus may include means for transmitting a control message that indicates a first resource for a first reference signal and a second resource for a second reference signal, the first resource associated with a half-duplex slot type and the second resource associated with a full-duplex slot type, means for transmitting at least one of the first reference signal or the second reference signal in accordance with the control message, and means for receiving at least one measurement report that includes first CSI for the half-duplex slot type and second CSI for the full-duplex slot type based on transmitting at least one of the first reference signal or the second reference signal.

A non-transitory computer-readable medium storing code for wireless communications at a network entity is described. The code may include instructions executable by a processor to transmit a control message that indicates a first resource for a first reference signal and a second resource for a second reference signal, the first resource associated with a half-duplex slot type and the second resource associated with a full-duplex slot type, transmit at least one of the first reference signal or the second reference signal in accordance with the control message, and receive at least one measurement report that includes first CSI for the half-duplex slot type and second CSI for the full-duplex slot type based on transmitting at least one of the first reference signal or the second reference signal.

In some examples of the method, apparatuses, and non-transitory computer-readable medium described herein, transmitting the control message may include operations, features, means, or instructions for transmitting a first measurement configuration for the first resource and a second measurement configuration for the second resource, where transmitting at least one of the first reference signal or the second reference signal may be based on the first measurement configuration, the second measurement configuration, or both.

In some examples of the method, apparatuses, and non-transitory computer-readable medium described herein, transmitting the control message may include operations, features, means, or instructions for transmitting a measurement configuration that indicates a first resource set and a second resource set, the first resource set including the first resource and the second resource set including the second resource, where transmitting at least one of the first reference signal or the second reference signal may be based on the measurement configuration.

In some examples of the method, apparatuses, and non-transitory computer-readable medium described herein, the measurement configuration includes an information element indicating a correspondence between the first resource set and the second resource set.

In some examples of the method, apparatuses, and non-transitory computer-readable medium described herein, transmitting the control message may include operations, features, means, or instructions for transmitting a measurement configuration that indicates a first resource set, the first resource set including the first resource and the second resource, where transmitting at least one of the first reference signal or the second reference signal may be based on the measurement configuration.

Some examples of the method, apparatuses, and non-transitory computer-readable medium described herein may further include operations, features, means, or instructions for receiving a message indicating a capability of a UE to measure the first CSI and the second CSI using the first reference signal, where transmitting the control message may be based on the capability.

In some examples of the method, apparatuses, and non-transitory computer-readable medium described herein, the message further indicates a threshold quantity of active reference signals supported at the UE, a threshold quantity of active antenna ports supported at the UE, or a combination thereof.

In some examples of the method, apparatuses, and non-transitory computer-readable medium described herein, receiving the at least one measurement report may include operations, features, means, or instructions for receiving a first measurement report that includes the first CSI and receiving a second measurement report that includes the second CSI.

In some examples of the method, apparatuses, and non-transitory computer-readable medium described herein, receiving the at least one measurement report may include operations, features, means, or instructions for receiving a single measurement report that includes the first CSI and the second CSI.

In some examples of the method, apparatuses, and non-transitory computer-readable medium described herein, the first CSI for the half-duplex slot type and the second CSI for the full-duplex slot type may be based on a measurement of the first reference signal.

In some examples of the method, apparatuses, and non-transitory computer-readable medium described herein, the first CSI for the half-duplex slot type may be based on the first reference signal and the second CSI for the full-duplex slot type may be based on a measurement of the second reference signal.

In some examples of the method, apparatuses, and non-transitory computer-readable medium described herein, transmitting the control message may include operations, features, means, or instructions for transmitting, for the first resource, an indication of a first quantity of antenna ports, a first scrambling ID, a first CDM type a first set of power control offsets, a first TCI state, a first periodicity and offset, a first density, or a combination thereof and transmitting, for the second resource, an indication of a second quantity of antenna ports, a second scrambling ID, a second CDM type a second set of power control offsets, a second TCI state, a second periodicity and offset, a second density, or a combination thereof.

In some examples of the method, apparatuses, and non-transitory computer-readable medium described herein, the second quantity of antenna ports may be a subset of the first quantity of antenna ports.

In some examples of the method, apparatuses, and non-transitory computer-readable medium described herein, the second quantity of antenna ports may be equivalent to the first quantity of antenna ports and the first set of power control offsets may be greater than the second set of power control offsets.

In some examples of the method, apparatuses, and non-transitory computer-readable medium described herein, the first scrambling ID may be equivalent to the second scrambling ID.

In some examples of the method, apparatuses, and non-transitory computer-readable medium described herein, the first CDM type may be equivalent to the second CDM type.

In some examples of the method, apparatuses, and non-transitory computer-readable medium described herein, the first set of power control offsets may be equivalent to the second set of power control offsets.

In some examples of the method, apparatuses, and non-transitory computer-readable medium described herein, the first TCI state may be different from the second TCI state.

In some examples of the method, apparatuses, and non-transitory computer-readable medium described herein, the first periodicity and offset may be different from the second periodicity and offset.

In some examples of the method, apparatuses, and non-transitory computer-readable medium described herein, the first density may be different from the second density.

In some examples of the method, apparatuses, and non-transitory computer-readable medium described herein, a second CDM group of the second resource may be a subset of a first CDM group of the first resource.

In some examples of the method, apparatuses, and non-transitory computer-readable medium described herein, one or more first time symbols and one or more first resource elements of the first resource may be equivalent to one or more second time symbols and one or more second resource elements of the second resource.

In some examples of the method, apparatuses, and non-transitory computer-readable medium described herein, one or more first time symbols of the first resource may be different from one or more second time symbols of the second resource, the one or more first time symbols and the one or more second time symbols being in a same transmission slot.

In some examples of the method, apparatuses, and non-transitory computer-readable medium described herein, a first transmission time slot of the first resource may be adjacent to a second transmission time slot of the second resource.

BRIEF DESCRIPTION OF THE DRAWINGS

FIGS. 13 through 16 show flowcharts illustrating methods that support channel estimation for full-duplex and half-duplex slots in accordance with one or more aspects of the present disclosure.

DETAILED DESCRIPTION

Figure 1:
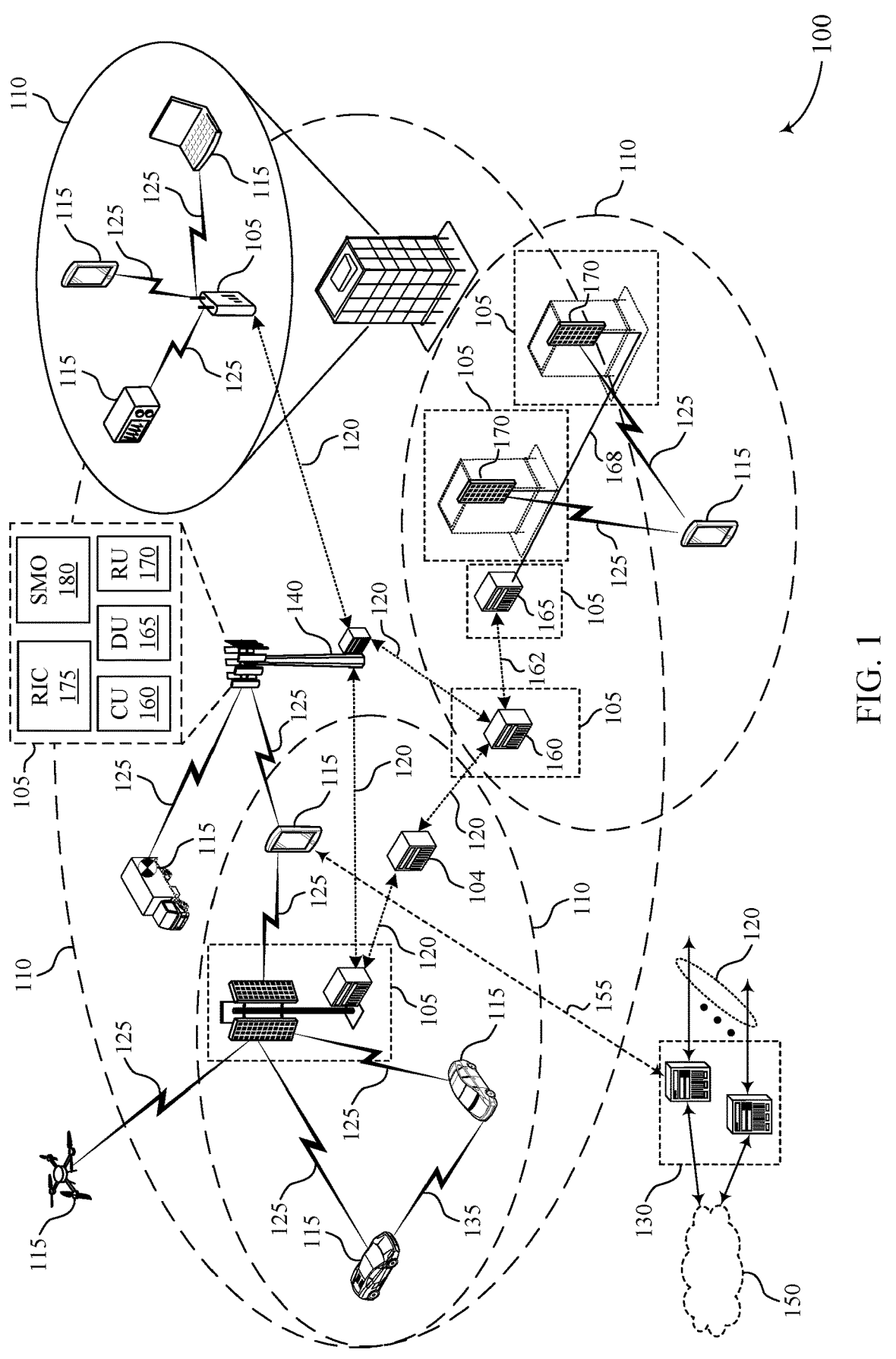
FIG. 1 shows an example of a wireless communications system that supports channel estimation for full-duplex and half-duplex slots in accordance with one or more aspects of the present disclosure.

In some wireless communications systems, one or more user equipments (UEs) may support communications with a network entity via a subband full-duplex (SFBD) slot (e.g., full-duplex slot) or a non-SBFD slot (e.g., half-duplex slot). The SBFD slot may include a first frequency portion for uplink resources and a second frequency portion for downlink resources. In such cases, the SBFD slot may include a third frequency portion (e.g., guard band) in between the first and second frequency portions in order to separate the uplink and downlink frequency portions. In this way, the network entity may transmit downlink messages and receive uplink messages with the one or more UEs at the same time using the respective portions of the SBFD slot. The non-SBFD slot may include (e.g., or be configured for) either uplink resources or downlink resources. As such, the network entity 105 may either receive uplink messages or transmit downlink messages to the one or more UEs using the non-SBFD slot. In such cases, if a UE supports both SBFD and non-SBFD slots, then the UE may provide respective channel state information (CSI) reports for both slots. Thus, techniques may be desired to obtain CSI for both SBFD and non-SBFD slots without incurring additional overhead at the UE, while also maintaining the accuracy of the CSI measurements.

The techniques described herein may enable the UE to perform channel estimation for SBFD and non-SBFD operations (e.g., for both SBFD and non-SBFD duplex types) using a common CSI reference signal (CSI-RS), thereby enabling the network entity to receive CSI information for both operations without incurring additional overhead at the UE. For example, the UE may receive a control message (e.g., a radio resource control (RRC) message) that indicates a first resource for a first CSI-RS (e.g., first reference signal) and a second resource for a second CSI-RS (e.g., second reference signal), where the first resource may be associated with non-SBFD operations and the second resource may be associated with SBFD operations.

In some examples, the two resources may be overlayed (e.g., have the same orthogonal frequency division multiplexing (OFDM) symbols and resource elements (REs)), which may be referred to as being common. In such examples, a quantity of antenna ports used by the network entity to transmit the second CSI-RS (e.g., SBFD CSI-RS) may be a subset of a quantity of antenna ports used by the network entity to transmit the first CSI-RS (e.g., non-SBFD CSI-RS). As such, because network entity transmits the first CSI-RS (e.g., non-SBFD CSI-RS) using, at least partially, the quantity of antenna ports associated with the second CSI-RS (e.g., SBFD CSI-RS), the UE may be able to estimate the CSI for both the non-SBFD and the SBFD operations using the first (e.g., common) CSI-RS. In this way, the UE may use the common CSI-RS for measurement of both SBFD and non-SBFD operations, thereby resulting in reduced overhead and improved communications between the UE and the network entity.

Aspects of the disclosure are initially described in the context of wireless communications systems. Aspects of the disclosure are further described in the context of resource diagrams and process flows. Aspects of the disclosure are further illustrated by and described with reference to apparatus diagrams, system diagrams, and flowcharts that relate to channel estimation for full-duplex and half-duplex slots.

FIG. 1 shows an example of a wireless communications system 100 that supports channel estimation for full-duplex and half-duplex slots in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support channel estimation for full-duplex and half-duplex slots as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the UE 115 and the network entity 105 may use one of an in-band full-duplex (IBFD) slot or a SBFD slot for communications. Such slots may be referred to as downlink plus uplink slots (e.g., D+U slots). Such slots (e.g., IBFD or SBFD) may be a slot in which the frequency band is used for both uplink and downlink messages, where such uplink and downlink messages may occur in overlapping bands (e.g., in the case of IBFD slots) or adjacent bands (e.g., in the case of SBFD slots). In a given symbol (e.g., D+U symbol) of such slots, if the UE 115 supports half-duplex communications, then the UE 115 may either transmit uplink messages via the uplink band or receive downlink messages via the downlink band. Alternatively, in a given symbol of such slots, if the UE 115 supports full-duplex communications, then the UE 115 may transmit uplink messages via the uplink band, receive downlink messages via the downlink band, or both in the same slot. As described herein, a downlink plus uplink slot (e.g., D+U slot) may contain downlink symbols, uplink symbols, or full-duplex symbols (e.g., IBFD or SBFD symbols). That is, as described herein, a full-duplex slot (e.g., SBFD slot) may refer to a slot that includes SBFD symbols. In such cases, if a UE 115 supports both SBFD and non-SBFD slots, then the UE 115 may provide respective CSI reports for both slots. Thus, techniques may be desired to obtain CSI for both SBFD and non-SBFD slots without incurring additional overhead at the UE 115, while also maintaining the accuracy of the CSI measurements.

The techniques described herein may enable the UE 115 to perform channel estimation for SBFD and non-SBFD operations (e.g., for both SBFD and non-SBFD duplex types) using a common CSI-RS, thereby enabling the network entity 105 to receive CSI information for both operations without incurring additional overhead at the UE 115. For example, the UE 115 may receive a control message (e.g., a radio resource control (RRC) message) that indicates a first resource for a first CSI-RS (e.g., first reference signal) and a second resource for a second CSI-RS (e.g., second reference signal), where the first resource may be associated with non-SBFD operations and the second resource may be associated with SBFD operations.

In some examples, the two resources may be overlayed (e.g., have the same orthogonal frequency division multiplexing (OFDM) symbols and resource elements (REs)), which may be referred to as being common. In such examples, a quantity of antenna ports used by the network entity 105 to transmit the second CSI-RS (e.g., SBFD CSI-RS) may be a subset of a quantity of antenna ports used by the network entity 105 to transmit the first CSI-RS (e.g., non-SBFD CSI-RS). As such, because network entity 105 transmits the first CSI-RS (e.g., non-SBFD CSI-RS) using, at least partially, the quantity of antenna ports associated with the second CSI-RS (e.g., SBFD CSI-RS), the UE 115 may be able to estimate the CSI for both the non-SBFD and the SBFD operations using the first (e.g., common) CSI-RS. In this way, the UE 115 may use the common CSI-RS for measurement of both SBFD and non-SBFD operations, thereby resulting in reduced overhead and improved communications between the UE 115 and the network entity 105.

Figure 2:
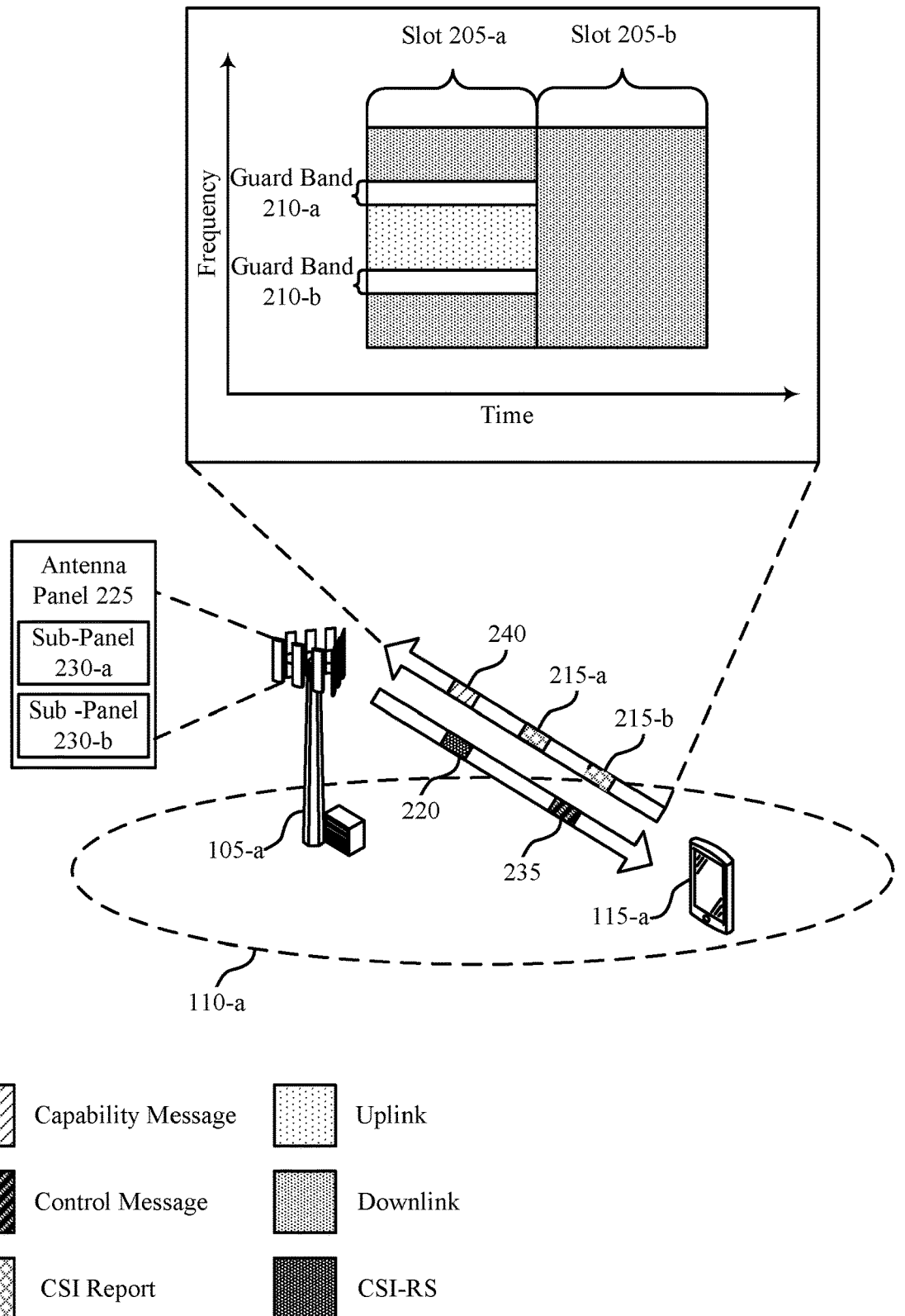
FIG. 2 shows an example of a wireless communications system that supports channel estimation for full-duplex and half-duplex slots in accordance with one or more aspects of the present disclosure.

FIG. 2 shows an example of a wireless communications system 200 that supports channel estimation for full-duplex and half-duplex slots in accordance with one or more aspects of the present disclosure. Aspects of the wireless communications system 200 may implement, or be implemented by, aspects of the wireless communications system 100 as described herein with reference to FIG. 1. For example, the wireless communications system 200 may include a UE 115-*a* operating within a coverage area 110-*a* of a network entity 105-*a*, which may be examples of corresponding devices as described herein. The techniques described in the context of the wireless communications system 200 may enable the UE 115-*a* efficiently measure CSI for the slot 205-*a* (e.g., SBFD or full-duplex slot) and the slot 205-*b* (e.g., non-SBFD or half-duplex slot).

In some cases, the network entity 105-*a* may support full-duplex operations according to two modes. For example, in a first mode, the network entity 105-*a* may simultaneously communicate both uplink and downlink messages using an IBFD slot (not shown) with various UEs 115 operating within the coverage area 110-*a*. In such IBFD slots, the network entity 105-*a* may receive uplink messages and transmit downlink messages via the same time and frequency resources, where the downlink and uplink messages share the same IBFD time and frequency resources. That is, in an IBFD slot, the uplink and downlink portions may be fully, or partially, overlapped, such that the network entity 105-*a* may transmit and receive messages simultaneously via the overlapped uplink and downlink resources.

In a second mode, the network entity 105-*a* may simultaneously communicate both uplink and downlink messages using the slot 205-*a* (e.g., SBFD slots or flexible duplex slots) with various UEs 115 within the coverage area 110-*a*. In such examples, the network entity 105-*a* may receive uplink messages and transmit downlink messages at the same time but via different frequency resources within the slot 205-*a* to the various UEs 115. As such, to facilitate such SBFD communications, the slot 205-*a* may have a first portion of frequency resources (e.g., upper and lower portions) for downlink communications and a second frequency portion for uplink communications.

For example, the downlink portions (e.g., both upper and lower portions) of the slot 205-*a* may be separated from the uplink portion of the slot 205-*a* in the frequency domain using guard bands 210. That is, an upper portion of the downlink resource of the slot 205-*a* may be separated from the uplink resource of the slot 205-*a* by a guard band 210-*a*, while a lower portion of the downlink resource of the slot 205-*a* may be separated from the uplink resource of the slot 205-*a* by a guard band 210-*b*. By using the guard bands 210, the uplink and downlink resources may be prevented from bleeding, or overlapping, with one another during use of the slot 205-*a*.

In such cases, the IBFD slot may be used by communications systems (e.g., 6G systems) that include full-duplex capable network entities 105 and full-duplex capable UEs 115 or full-duplex capable network entities 105 (e.g., using multi-transmission reception points (TRP)) and SBFD capable UEs 115. Further, the slot 205-*a* (e.g., SBFD slots) may be used in communications systems that include full-duplex capable network entities 105 and half-duplex capable UEs 115. That is, the UE 115-*a* (e.g., SBFD capable UE 115) may support half-duplex communications using the slot 205-*a*, where the UE 115-*a* may receive one or more downlink messages via the upper and lower portions of the downlink resources of the slot 205-*a* or transmit one or more uplink messages via the uplink resource of the slot 205-*a*. Alternatively, the UE 115-*a* may support full-duplex communications using the slot 205-*a*.

In some cases, the UE 115-*a* and the network entity 105-*a* may support, or otherwise use, a slot 205-*b* for non-SBFD communications (e.g., half-duplex operations or TDD communications). In order to facilitate such non-SBFD communications, the UE 115-*a* may either transmit uplink messages, or receive downlink messages, via non-SBFD slots, such as the slot 205-*b*. As illustrated in FIG. 2, the slot 205-*b* may be configured to support downlink communications, such that the network entity 105-*a* may transmit one or more downlink messages via the downlink frequency resources of the slot 205-*b*. Alternatively, the slot 205-*b* may be configured to support uplink communications, such that the UE 115-*a* may transmit one or more uplink messages via the uplink frequency resources of the slot 205-*b*. In some other cases, the network entity 105-*a* may support full-duplex communications, while the UE 115-*a* may support half-duplex communications.

In cases when the UE 115-*a* supports the slot 205-*a* (e.g., SBFD slots with no downlink and uplink resources overlapping in frequency), then the UE 115-*a* and the network entity 105-*a* may implement techniques to enhance subband time and frequency location indication, enhance resource allocation in symbols within the subband, enhance CSI measurement and CSI feedback for SBFD operations (e.g., communications using SBFD slots, such as the slot 205-*a*), or a combination thereof. In the case of enhancements to CSI feedback for SBFD operations, the UE 115-*a* (e.g., SBFD aware UE) may implement various methods for transmitting CSI reports 215 associated with periodic or semi-persistent CSI-RSs, at least, across SBFD symbols and non-SBFD symbols in different slots 205 (e.g., each CSI-RS resource within a slot 205 has either all SBFD or all non-SBFD symbols). In a first option, the UE 115-*a* may transmit separate CSI reports 215 (e.g., a CSI report 215-*a* and a CSI report 215-*b*) for the SBFD symbols and non-SBFD symbols (e.g., the SBFD or full-duplex operations). In a second option, the UE 115-*a* may transmit a single (e.g., the same) CSI report 215 for both SBFD symbols and non-SBFD symbols (e.g., for the non-SBFD or half-duplex operations).

In order to support communications via the slot 205-*a* (e.g., SBFD operations), the network entity 105-*a* may use on or more sub-panels 230 of an antenna panel 225 using a split panel approach. For example, for non-SBFD operations, the network entity 105-*a* may use the sub-panel 230-*a* and the sub-panel 230-*b* for either receiving uplink messages or transmitting downlink messages. That is, the network entity 105-*a* may use both sub-panels 230 for either uplink or downlink communications. For SBFD operations, the network entity 105-*a* may use the sub-panel 230-*a* for downlink communications, while using sub-panel 230-*b* for uplink communications. In such examples, each sub-panel 230 may have the same quantity of antenna ports (e.g., for CSI-RS ports) as compared to the antenna panel 225 (e.g., full panel), but be configured with lower power per antenna port as compared to the antenna panel 225. Alternatively, each sub-panel 230 may have half the quantity of antenna ports (e.g., CSI-RS ports) as compared to the antenna panel 225, but be configured with the same power per port as compared to the antenna panel 225. Further, such splits may be non-even. For example, the sub-panel 230-*a* may include an increased or decreased quantity of antenna ports as compared to those of the sub-panel 230-*b*. As described herein, SBFD operations may refer to communications based on the split antenna panel approach as described herein. Further, non-SBFD operations, or half-duplex operations, may refer to communications based on a full antenna panel approach as described herein.

As an illustrative example, if the antenna panel 225 has 128 cross polarized (xpol) antenna elements (e.g., 16×8 antennas), then those 128 xpol antenna elements may be mapped to 32 antenna ports (e.g., RxRu 2×8, 16 for transmission and 16 for reception) by an 8 by 1 (e.g., 8×1) combiner in vertical. That is, each of the 32 antenna ports may be mapped to 8 antenna elements (e.g., each of the 16 transmission ports mapped to 8 antennas and each of the 16 reception ports mapped to 8 antennas) of the antenna panel 225 (e.g., full panel). As such, to support SBFD communications, each sub-panel 230 may split to have 64 xpol antenna elements each, where such 64 xpol antenna elements may be mapped to 32 antenna ports (e.g., 2×8) by a 1 by 4 combiner. That is, each of the 32 antenna ports may be mapped to 4 antenna elements, where in such cases, each port may have half power (e.g., −3 dB less power) due to the reduced quantity of antenna elements per antenna port. Alternatively, each sub-panel 230 may be split to have 64 xpol antenna elements, where such 64 xpol antenna elements may be mapped to 16 antenna ports (e.g., 1×8) by a 8 by 1 combiner (e.g., 8×1). As such, each of the 16 antenna ports may be mapped to 8 antenna elements, where each port may have the same power as that of the full panel due to an equivalent port to antenna mapping as the antenna panel 225.

In such cases, if the UE 115-*a* supports both SBFD operations and non-SBFD operations (e.g., communications via varying antenna ports for the slot 205-*a* and the slot 205-*b*), then the UE 115-*a* may provide CSI reports 215 for each of the operations, such that the network entity 105-*a* may have CSI for the downlink channels of such slots. Thus, techniques may be desired to obtain CSI for both SBFD and non-SBFD operations without incurring additional overhead at the UE 115-*a*, while also maintaining the accuracy of the CSI measurements. That is, it may be desirable for the UE 115-*a* to use a common CSI-RS 220 (e.g., single CSI-RS) for channel estimation of the downlink resources of the slot 205-*a* (e.g., SBFD slot or symbols) and of the slot 205-*b* (e.g., non-SBFD slot or symbols). Using current techniques, the network entity 105-*a* may configure the common CSI-RS 220 for non-SBFD operations, where a quantity of antenna ports configured for the common CSI-RS 220 may be equal to the quantity of antenna ports supported for the slot 205-*b* (e.g., up to 32 antenna ports). As such, it may be desirable for the network entity 105-*a* to indicate the quantity of ports used for transmissions in SBFD operations (e.g., during transmissions in the slot 205-*a*) as part of a CSI-RS resource configuration, where the CSI-RS resource configuration may include a port subset restriction, such that the UE 115-*a* may be able to measure the CSI for both the SBFD and non-SBFD operations using the common CSI-RS 220.

The techniques described herein may enable the network entity 105-*a* to configure the common CSI-RS 220, such that the UE 115-*a* may use the common CSI-RS 220 for channel estimation for both SBFD operations and non-SBFD operations. For example, when the network entity 105-*a* adapts the quantity of downlink antenna ports between the slot 205-*a* and the slot 205-*b* and the port to antenna mapping is the same for common ports of the slot 205-*a* and the slot 205-*b*, the UE 115-*a* may be able to use the common CSI-RS 220 configured for the slot 205-*b* for channel estimation for both the slot 205-*a* and the slot 205-*b*. As such, the techniques described herein may enable the network entity 105-*a* to configure a CSI-RS resource for the common CSI-RS 220 for channel estimation when transmissions for the slot 205-*a* and the slot 205-*b* are transmitted according to a different quantity of active antenna ports or are transmitted according to the same quantity of ports but have a power mismatch. In this way, because the UE 115-*a* has an indication of which antenna ports are associated with transmission of the common CSI-RS 220, the UE 115-*a* may be able to distinguish, and measure, the common CSI-RS 220 and obtain, or generate, CSI for the SBFD operations and non-SBFD operations based on the common CSI-RS 220.

In some examples, the network entity 105-*a* may transmit a control message 235 (e.g., such as a RRC message) to configure the UE 115-*a* with two overlayed CSI-RS resources. That is, the network entity 105-*a* may configure the UE 115-*a*, via the control message 235, with a first CSI-RS resource for the common CSI-RS 220 (e.g., first reference signal) and a second CSI-RS resource for a second CSI-RS (not shown), where the two CSI-RS resources may be overlayed (e.g., on top of each other). That is, the first CSI-RS resource and the second CSI-RS resource may be configured with the same OFDM symbols and the same REs as described herein with reference to FIGS. 3A and 3B. In such examples, the first CSI-RS resource may be associated with non-SBFD operations (e.g., have a quantity of antenna ports supported by non-SBFD slots), while the second CSI-RS resource may be associated with SBFD operations (e.g., have a reduced quantity of antenna ports supported by SBFD slots). Such CSI-RS resources may be an example of a non-zero power (NZP) CSI-RS (e.g., NZP-CSI-RS-Resource) and may be configured via the control message 235 as detailed below:

```
NZP-CSI-RS-Resource ::=    SEQUENCE {
    nzp-CSI-RS-ResourceId     NZP-CSI-RS-ResourceId,
    resourceMapping           CSI-RS-ResourceMapping,
    powerControlOffset        INTEGER (−8..15),
    powerControlOffsetSS      ENUMERATED{db−3, db0, db3, db6}
    scramblingID              ScramblingId,
    periodicityAndOffset      CSI-ResourcePeriodicityAndOffset
    qcl-InfoPeriodicCSI-RS    TCI-StateId
    ...
}
```

In one example, the two CSI-RS resources may be configured with a different quantity of antenna ports. For example, the network entity 105-a may configure the first CSI-RS resource associated with the non-SBFD operations with 32 antenna ports, and configure the second CSI-RS resource associated with the SBFD operations with 16 antenna ports. As such, because the first CSI-RS resource and the second CSI-RS resource are overlayed (e.g., have the same OFDM symbols and REs), then the network entity 105-a may transmit, via the first CSI-RS resource, the common CSI-RS 220 (e.g., first reference signal or common reference signal) to the UE 115-a (and refrain from transmitting the second CSI-RS), where the UE 115-a may measure the common CSI-RS to obtain first CSI for the non-SBFD operations (e.g., for communications using the slot 205-b) and obtain second CSI for the SBFD operations (e.g., communications using the slot 205-b) based on the common CSI-RS 220. As described herein, the common CSI-RS 220 may be transmitted in any slot type (e.g., SBFD, IBFD, non-SBFD, or the like). As such, because the UE 115-a has an indication of the antenna ports associated with each CSI-RS resource and the CSI-RS resources are overlayed, the UE 115-a may be able to obtain the first CSI and the second CSI based on the common CSI-RS 220.

In order for the UE 115-a to measure CSI for both SBFD and non-SBFD operations using the common CSI-RS 220, the network entity 105-a may configure the first CSI-RS resource and the second CSI-RS resource with the same parameters. For example, the network entity 105-a may configure the first CSI-RS resource and the second CSI-RS resource with the same scrambling identifier (ID), such that the common CSI-RS 220 and the second CSI-RS have the same sequence. Further, the network entity 105-a may configure the two CSI-RS resources with the same code division multiplexing (CDM) type (e.g., FDM2, (FDM2, TDM2), CDM2, CDM4, CDM6, or the like).

Additionally, in some examples, the network entity 105-a may configure the two CSI-RS resources to have common CDM groups, such that the antenna ports of the second CSI-RS resource for the SBFD operations are equivalent to those of the first CSI-RS resource for the non-SBFD operations. Alternatively, the network entity 105-a may configure the two CSI-RS resources to have common antenna ports per CDM group, such that antenna ports in a common CDM group may be sub-sampled by the UE 115-a. In this way, the UE 115-a may derive the CSI for the SBFD operations (e.g., communications using SBFD slots) based on the common CDM groups, common antenna ports, or both between first resource of the common CSI-RS 220 and the second resource of the second CSI-RS, while the UE 115-a may derive the CSI for the non-SBFD operations based on all the antenna ports of the common CSI-RS 220 (e.g., up to 32 antenna ports for non-SBFD slots).

That is, because each CSI-RS resource are overlayed (e.g., have the same OFDM symbols and REs) and the antenna ports used to transmit the second CSI-RS are a subset of the antenna ports used to transmit the common CSI-RS 220, the network entity 105-a may transmit the common CSI-RS 220. As such, the UE 115-a may measure and obtain CSI for the SBFD operations based on the overlapping, or common, antenna ports between the common CSI-RS 220 and the second CSI-RS and measure and obtain CSI for the non-SBFD operations based on all the configured antenna ports of the common CSI-RS 220. In this way, the UE 115-a may sample, or otherwise derive, the CSI for both operations based on the common CSI-RS 220.

Further, the network entity 105-a may configure the two CSI-RS resources to have the same set of power control offsets (e.g., the same powerControlOffset and powerCotnrolOffsetSS). That is, each CSI-RS resource may be associated with two power control offsets (e.g., powerControlOffset and powerCotnrolOffsetSS). As such, the network entity 105-a may configure the two CSI-RS resources to have the same two power control offsets in order for the UE 115-a to measure the common CSI-RS 220 to obtain CSI for both the SBFD and non-SBFD operations. In such examples, one or more parameters of the two CSI-RS resources may be different. For example, the network entity 105-a may configure each CSI-RS resource with different transmission configuration indicator (TCI) state IDs, different periodicity and offsets, different densities, or the like.

In this way, by configuring the two CSI-RS resources in the control message 235, the UE 115-a may have indication of the common antenna ports between the second CSI-RS associated with the SBFD operations and the common CSI-RS 220 associated with the non-SBFD operations, where the antenna ports associated with second CS-RS (e.g., second reference signal) may be a subset of the antenna ports associated with the common CSI-RS 220. As such, the common CSI-RS 220 may be used by the UE 115-a to measure and obtain CSI for both SBFD and non-SBFD operations due to the overlap of antenna ports, overlap of OFDM symbols, overlap of REs, or the like.

In some examples, the network entity 105-a may configure the two CSI-RS resources with the same quantity of antenna ports but different power offsets (e.g., powerControlOffset and powerCotnrolOffsetSS). For example, the network entity 105-a may configure the first CSI-RS resource and the second CSI-RS resource with 32 antenna ports, but configure the first CSI-RS resource with a first power offset (e.g., X1 dB) and configure the second CSI-RS resource with a second power offset (e.g., X2 dB), where the first and second power offsets are different. In such cases, because the antenna ports for each of the CSI-RSs are the same and the UE 115-a has indication of the power difference between such CSI-RS resources (e.g., the power is reduced for the SBFD slot), the UE 115-a may measure the common CSI-RS 220 to obtain the CSI for the SBFD and non-SBFD operations (e.g., for the slot 205-a and the slot 205-b).

The network entity 105-a may indicate the CSI-RS resources (e.g., NZP-CSI-RS-Resource) for the common CSI-RS 220 and the second CSI-RS via various measurement configurations of the control message 235. In one example, the network entity 105-a may configure the two CSI-RS resources via two different measurement configurations (e.g., resourceConfigs) of the control message 235. In such examples, the network entity 105-*a* may link the respective measurement configurations in the control message 235 (e.g., RRC configuration). In another example, the network entity 105-*a* may configure the two CSI-RS resources via two different resource sets (e.g., NZP-CSI-RS-ResourceSet) of the same measurement configuration (e.g., same resourceConfig). In such examples, the network entity 105-*a* may include an information element (e.g., flag) in the measurement configuration (e.g., resourceConfig) in order to indicate a correspondence (e.g., linkage) between the two resource resources sets of the measurement configuration.

In another example, the network entity 105-*a* may configure the two CSI-RS resources using the same resource set (e.g., NZP-CSI-RS-ResourceSet). In such examples, the network entity 105-*a* may define two resource groups within the resource set (e.g., similar to mTRP CSI) where such resource groups may be distinguished, or otherwise associated with, different antenna ports. For example, a first resource group may be associated with full antenna ports (e.g., 32 antenna ports for the non-SBFD operations), while a second resource group may be associated with a subset of the full antenna ports (e.g., less than 32 antenna ports for the SBFD operations).

In some examples, the network entity 105-*a* may determine which configuration to use for indicating the CSI-RS resources to the UE 115-*a* based on whether the UE 115-*a* is to multiplex the first CSI for the slot 205-*a* with the second CSI for the non-SBFD operation via the CSI report 215-*a* (e.g., single CSI report) or whether the UE 115-*a* is to transmit the first CSI for the non-SBFD operation via the CSI report 215-*a* and the second CSI for the SBFD operation via the CSI report 215-*b*.

In some examples, the UE 115-*a* and the network entity 105-*a* may count the two overlapping CSI-RS resources as separate resources or a single resource. In one example, the two CSI-RS resources may be counted as two separate resources and the quantity of antenna ports for both CSI-RS resources may be added to the separate resource configurations for the purpose of determining UE capability related to the quantity of simultaneously active CSI-RS resources at the UE 115-*a*, the quantity of simultaneously active antenna ports for CSI-RSs, or both. In another example, the two overlapping CSI-RS resources may be counted as one resource. That is, the first CSI-RS resource for the common CSI-RS 220 (e.g., non-SBFD CSI-RS) may be used in counting the quantity of active resources or the quantity of active ports for the UE 115-*a*. In such examples, the UE 115-*a* may be able to jointly measure (e.g., process) the common CSI-RS 220 to obtain the CSI for non-SBFD and SBFD operation. Such capability may be an advanced UE capability.

For example, the UE 115-*a* may transmit a capability message 240 indicating a capability of the UE 115-*a* to measure the first CSI for the non-SBFD operations and the second CSI for the SBFD operations using the common CSI-RS 220. In such examples, the UE 115-*a* may further indicate, via the capability message 240, a threshold (e.g., maximum) quantity of active CSI-RSs supported at the UE 115-*a*, a threshold quantity of active antenna ports supported at the UE 115-*a*, or any combination thereof. As such, the network entity 105-*a* may determine how to count the two CSI-RS resources based on the capability message 240.

In this way, by refraining from configuring CSI-RS resources dedicated for the SBFD and non-SBFD operations respectively, the UE 115-*a* and the network entity 105-*a* may experience overhead reduction for channel estimation due to the resource associated with non-SBFD operations (e.g., a resource configured with a full quantity of antenna ports, or 32 antenna ports) being used to obtain CSI for both SBFD and non-SBFD operations. Further, by indicating to the UE 115-*a* the relationship between active ports of the common CSI-RS 220 for and the second CSI-RS for, the UE 115-*a* may leverage proprietary algorithms from various vendors in order to improve channel estimation by considering the channels of both SBFD and non-SBFD operations (e.g., the slot 205-*a* and the slot 205-*b*).

In some other examples, the network entity 105-*a* may configure the UE 115-*a* with two CSI-RS resources that are linked by configuration. In one example, the network entity 105-*a* may configure two CSI-RS resources for a first CSI-RS (not shown) and a second CSI-RS (not shown), where the two CSI-RS resources are configured to be associated with different symbols within the same slot 205 (e.g., not overlayed). In another example, the network entity 105-*a* may configure the two CSI-RS resource to be within adjacent slots 205 and have different periodicities (e.g., which may be beneficial if phase coherency is assumed similar to assumptions of DMRS bundling). In either example, the two CSI-RS resources may be configured to have common CDM groups or common antenna ports per CDM group.

In such examples, the network entity 105-*a* may transmit the two CSI-RSs, one for each CSI-RS resource, such that the UE 115-*a* may measure and obtain the CSI for the SBFD and non-SBFD operations based on the first CSI-RS and the second CSI-RS, respectively. That is, the network entity 105-*a* configure two separate CSI-RS resources for two separate CSI-RSs. As such, the first CSI-RS resource may be associated with non-SBFD operations (e.g., be configured with a quantity of antenna ports supported by non-SBFD slots), while the second CSI-RS resource may be associated with SBFD operations (e.g., be configured with a quantity of antenna ports supported by SBFD slots). In this way, the network entity 105-*a* may transmit both CSI-RSs via the two CSI-RS resources, such that UE 115-*a* may measure the second CSI-RS to obtain the CSI for the SBFD operations (e.g., communications using slot 205-*a*) and measure the first CSI-RS to obtain the CSI for the non-SBFD operations (e.g., communications using slot 205-*b*).

As such, the UE 115-*a* and the network entity 105-*a* may not experience overhead reduction as the UE 115-*a* is configured with two CSI-RS resources and the network entity 105-*a* transmits two CSI-RSs via both CSI-RS resources. However, in such examples, the UE 115-*a* may be able to use both CSI-RSs to measure the common ports associated with both the SBFD and non-SBFD operations and obtain the CSI for both communications via both slots 205, which may increase the reliability and accuracy of the CSI measurement for the common antenna ports.

Figure 3A:
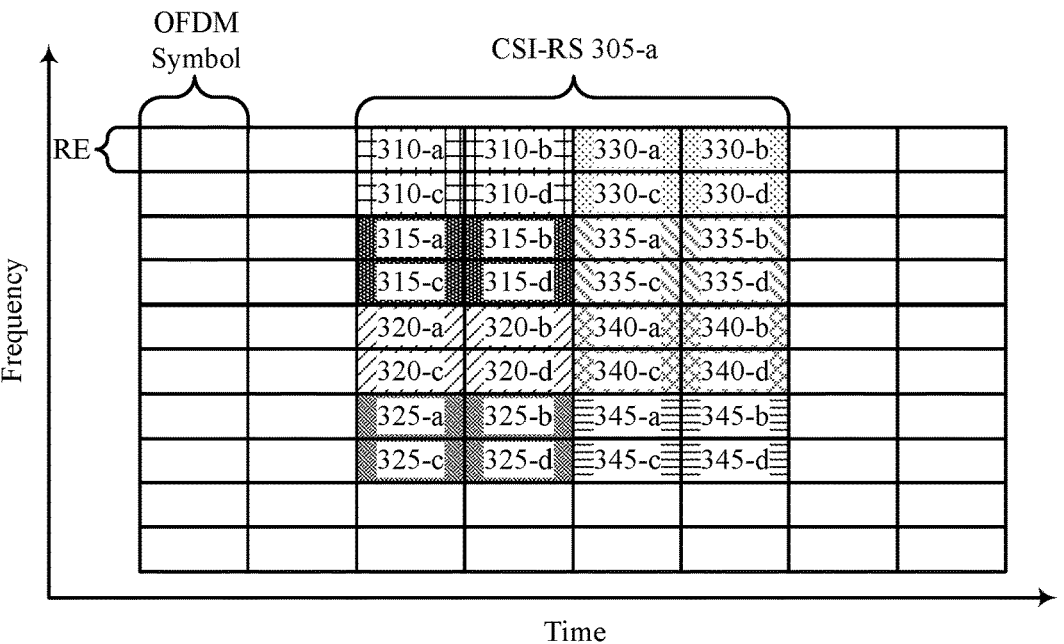
FIG. 3A and FIG. 3B show examples of resource diagrams that support channel estimation for full-duplex and half-duplex slots in accordance with one or more aspects of the present disclosure.
Figure 3B:
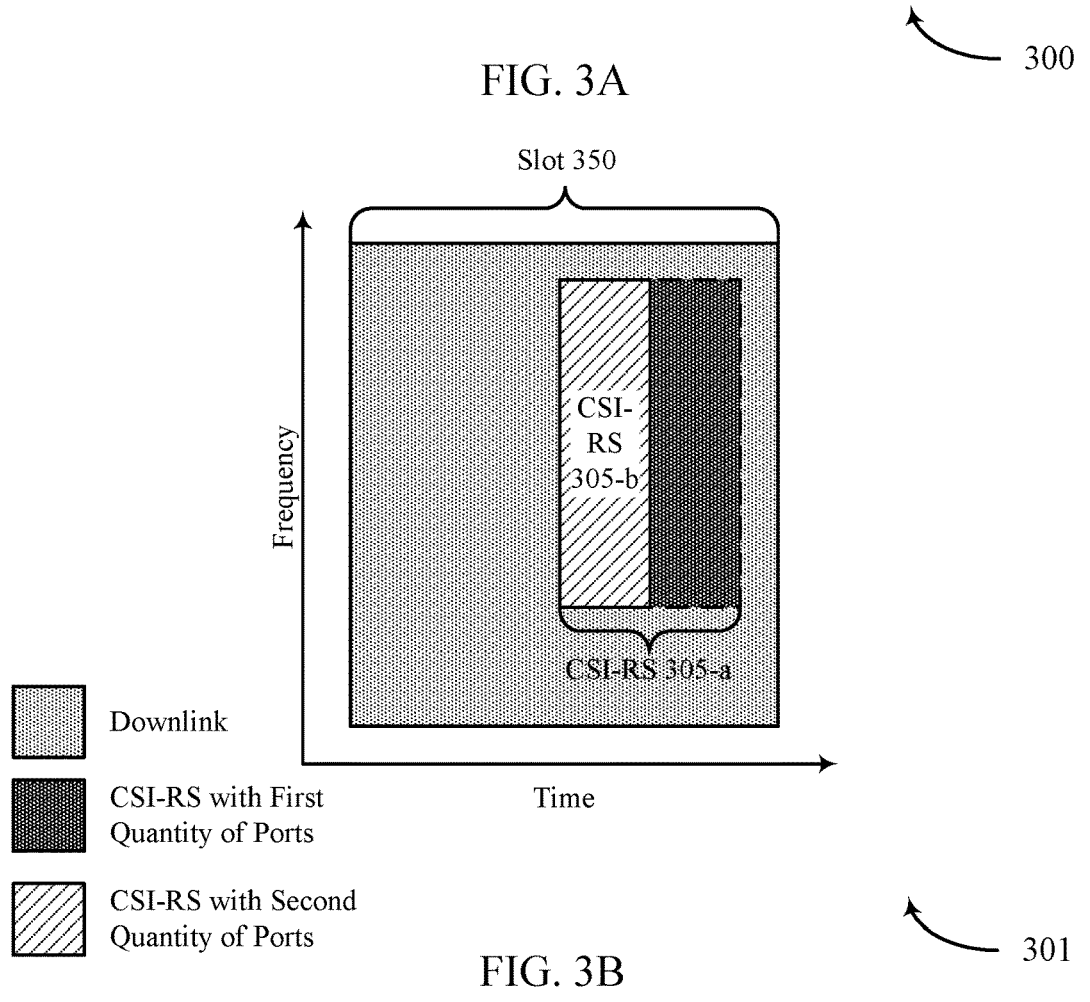

FIG. 3A and FIG. 3B show examples of a resource diagram 300 and a resource diagram 301 that support channel estimation for full-duplex and half-duplex slots in accordance with one or more aspects of the present disclosure. Aspects of the resource diagram 300 and the resource diagram 301 may be implemented by aspects of the wireless communications system 100 and the wireless communications system 200 as described herein with reference to FIGS. 1 and 2. For example, the resource diagram 300 and the resource diagram 301 may be implemented by a network entity 105 and a UE 115, which may be examples of corresponding devices as described herein. The techniques described in the context of the resource diagram 300 and the resource diagram 301 may enable the UE 115 to measure a common CSI-RS 305-*a* (e.g., such as the common CSI-RS 220) to obtain CSI for both SBFD and non-SBFD operations.

For example, the resource diagram 300 may include one or more OFDM symbols (e.g., time resources), where each OFDM symbol may include multiple REs (frequency resources). As described herein, the network entity 105 may include various antenna ports at which to transmit the common CSI-RS 305-*a*, where each antenna port may be mapped to, or otherwise transmit via, a single RE. For example, the network entity 105, as part of non-SBFD operations, may use 32 antenna ports to transmit the common CSI-RS 305-*a* via 32 REs of a non-SBFD slot and, as part of SBFD operations, may use a subset of the 32 antenna ports (e.g., 8 or 16 antenna ports) to transmit the CSI-RS 305-*b* via a subset of the 32 REs (e.g., 8 or 16 REs). As such, in accordance with the techniques described herein, the network entity 105-*a* may configure the common CSI-RS 305-*a*, such that the UE 115 may receive and measure the common CSI-RS 305-*a* to obtain CSI for both the non-SBFD and SBFD operations.

In order to configure the common CSI-RS 305-*a*, the network entity 105 may configure a first CSI-RS resource for the common CSI-RS 305-*a* and a second CSI-RS resource for the CSI-RS 305-*b*. In such examples, the first CSI-RS resource may be associated with, or otherwise for, generation of CSI for non-SBFD operations (e.g., be configured with a quantity of antenna ports supported by the non-SBFD slot), while the second CSI-RS resource may be associated with, or otherwise for, generation of CSI for SBFD operations (e.g., be configured with a quantity of antenna ports supported by the SBFD slot).

In such examples, the network entity 105 may configure the two CSI-RS resources such that the two CSI-RS resources are overlayed (e.g., have the same REs and OFDM symbols). As such, the network entity 105 may configure the two CSI-RS resources with the same, or common, antenna ports, such that antenna ports used to transmit the CSI-RS 305-*b* may be a subset of the antenna ports used to transmit the common CSI-RS 305-*a*. In this way, the common CSI-RS 305-*a* may encompass the REs and OFDM symbols of the CSI-RS 305-*b*, thereby enabling the UE 115 to measure the CSI of the REs for both the non-SBFD and SBFD operations. That is, because the UE 115 has an indication of the antenna ports, OFDM symbols, and REs associated with each the common CSI-RS 305-*a* and the CSI-RS 305-*b*, the UE 115 may be able to leverage such information in order to obtain CSI for both SBFD and non-SBFD operations based on the common CSI-RS 305-*a*.

In order to configure the two CSI-RS resources such that they are overlayed and include common antenna ports, the network entity 105 may configure the two CSI-RS resources with the same CDM type (e.g., such as CDM2, CDM4, CDM6, or the like) and with the same, or common, CDM groups. As an illustrative example, the network entity 105 may configure the two CSI-RS resources to be CDM4 (e.g., CDM-Type), where the CDM4 may span two subcarriers (FD2) and two OFDM symbols (TD2) (e.g., for a total of four REs in a single group). In such examples, 32 antenna ports of the network entity 105 may be divided into 8 CDM groups (e.g., CDM group indices).

For example, in a first CDM group (e.g., CDM group index 0), RE 310-*a*, RE 310-*b*, RE 310-*c* and RE 310-*d* may be grouped together, while in a second CDM group (CDM group index 1), RE 315-*a*, RE 315-*b*, RE 315-*c*, and RE 315-*d* may be grouped together. Likewise, in a third CDM group (e.g., CDM group index 2), RE 320-*a*, RE 320-*b*, RE 320-*c*, and RE 320-*d* may be grouped together, while in a fourth CDM group (e.g., CDM group index 3), RE 325-*a*, RE 325-*b*, RE 325-*c*, and RE 325-*d* may be grouped together. In a fifth CDM group (e.g., CDM group index 4), RE 330-*a*, RE 330-*b*, RE 330-*c*, and RE 330-*d* may be grouped together, while in a sixth CDM group (e.g., CDM group index 5), RE 335-*a*, RE 335-*b*, RE 335-*c*, and RE 335-*d* may be grouped together. In a seventh CDM group (e.g., CDM group index 5), RE 340-*a*, RE 340-*b*, RE 340-*c*, and RE 340-*d* may be grouped together, while in a eight CDM group, RE 345-*a*, RE 345-*b*, RE 345-*c*, and RE 345-*d* may be grouped together.

As such, the network entity 105 may configure the first CSI resource for the common CSI-RS 305-*a* with 32 ports and configure the second CSI-RS resource for the CSI-RS 305-*b* with either 16 or 8 ports. Alternatively, the network entity 105 may configure the first CSI-RS resource for the common CSI-RS 305-*a* with 16 ports and configure the second CSI-RS resource for the CSI-RS 305-*b* with 8 ports. In this way, the REs associated with the CSI-RS 305-*b* may be a subset of the REs associated with the common CSI-RS 305-*a*. That is, the CSI-RS 305-*b* may be configured with a subset of CDM group indices and REs of the common CSI-RS 305-*a* based on the common CSI-RS 305-*a* being configured with a higher quantity of antenna ports as detailed in table 1.

TABLE 1

| Row | Ports | Density | CDM-Type | Location of Anchor RE | CDM Group Index |
|---|---|---|---|---|---|
| 8 | 8 | 1 | CDM4 (FD2, TD2) | $(k_0, l_0), (k_1, l_0)$ | 0, 1 |
| 12 | 16 | 1, 0.5 | CDM4 (FD2, TD2) | $(k_0, l_0), (k_1, l_0), (k_2, l_0), (k_3, l_0)$ | 0, 1, 2, 3 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1), (k_2, l_1), (k_3, l_1)$ | 0, 1, 2, 3, 4, 5, 6, 7 |

FIG. 3B. As such, with reference to the resource diagram 301, because the REs, OFDM symbols, and antenna ports of the common CSI-RS 305-*a* encompasses, or otherwise, overlap those of the CSI-RS 305-*b*, in a slot 350, the UE 115 may be able to measure CSI for both SBFD and non-SBFD operations (e.g., measure CSI for transmissions using both full antenna ports and a decreased quantity of antenna ports) based on the configuration of the two CSI-RS resources. In this way, the UE 115 may experience a reduction in signaling overhead, while also reporting CSI for SBFD and non-SBFD operations based on measuring the common CSI-RS 305-*a*.

Figure 4:
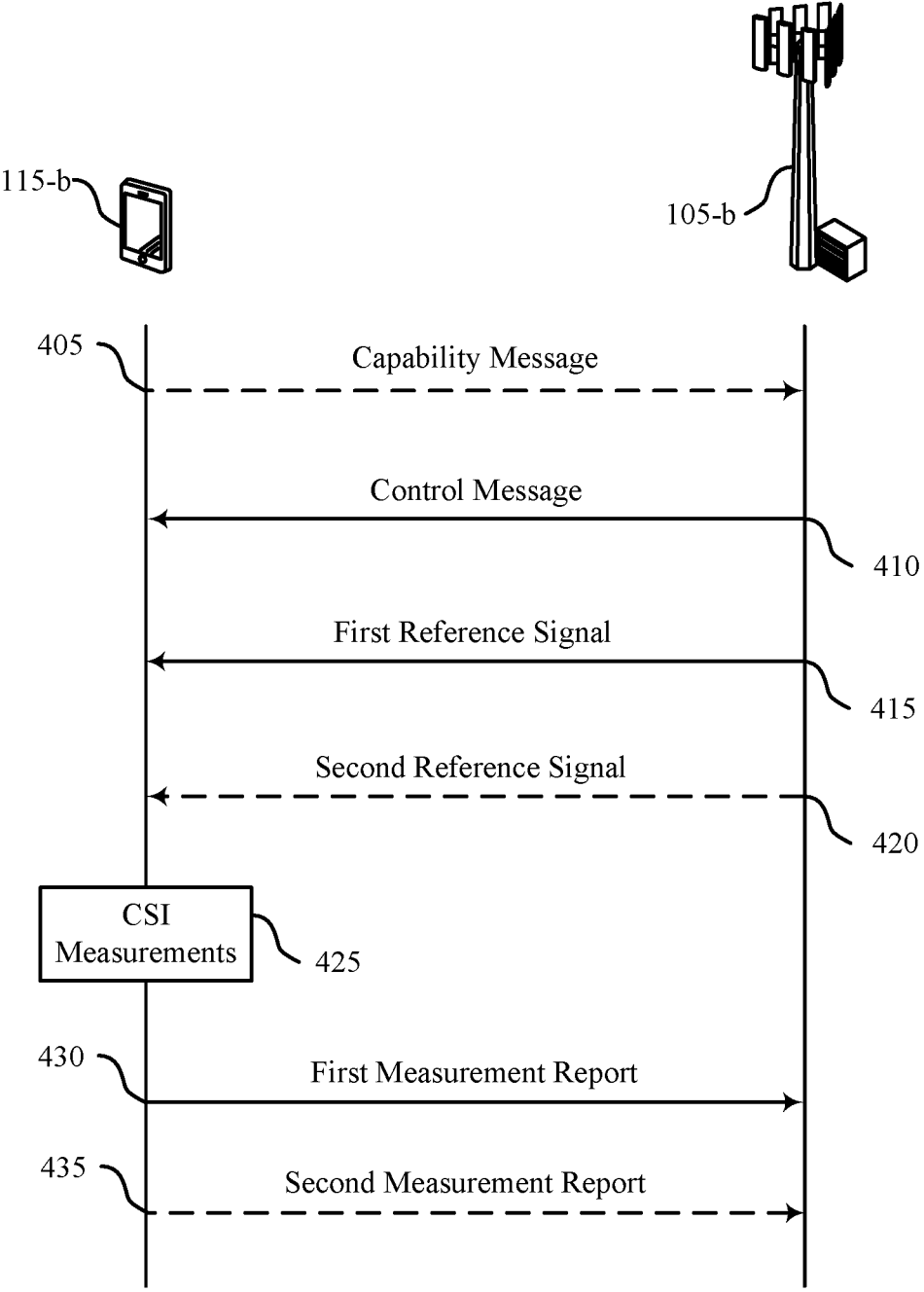
FIG. 4 shows an example of a process flow that supports channel estimation for full-duplex and half-duplex slots in accordance with one or more aspects of the present disclosure.

FIG. 4 shows an example of a process flow 400 that supports channel estimation for full-duplex and half-duplex slots in accordance with one or more aspects of the present disclosure. Aspects of the process flow 400 may implement, or be implemented by, aspects of the wireless communications system 100, the wireless communications system 200, the resource diagram 300, the resource diagram 301 as described herein with reference to FIGS. 1 through 3B. The process flow 400 may include a UE 115-*b* and a network entity 105-*b*, which may be examples of corresponding devices as described herein. The techniques described in the context of the process flow 400 may enable the UE 115-*b* to obtain, or otherwise generate, CSI for both SBFD and non-SBFD operations using a common CSI-RS.

At 405, the UE 115-*b* may transmit a message (e.g., such as a capability message 240) indicating a capability of the UE 115-*b* to measure a first CSI-RS (e.g., common CSI-RS or the common CSI-RS 220 or the common CSI-RS 305-*a*) to obtain first channel state information for non-SBFD operations and second channel state information for SBFD operations. In such examples, the UE 115-*b* may further indicate, via the message, a threshold quantity of active CSI-RSs supported at the UE 115-*b*, a threshold quantity of active antenna ports supported at the UE 115-*b*, or any combination thereof.

At 410, the network entity 105-*b* may transmit a control message that indicates a first resource for the first CSI-RS (e.g., the common CSI-RS 220 or the common CSI-RS 305-*a*) and a second resource for the second CSI-RS, where the first resource may be associated with generation of the first CSI for non-SBFD operations and the second resource may be associated with generation of the second CSI for SBFD operations. In some examples, the network entity 105-*a* may configure the first resource and the second resource for the CSI-RSs as part of respective measurement configurations, respective resource sets of a single measurement configuration, or as part of the same resource set of a single measurement configuration as described herein with reference to FIG. 2.

In some examples, the network entity 105-*b* may configure, for the first resource, a first quantity of antenna ports, a first scrambling identifier, a first CDM type, a first set of power control offsets, a first TCI state, a first periodicity and offset, a first density, or any combination thereof and indicate such configurations to the UE 115-*a* via the control message. Similarly, the network entity 105-*b* may configure, for the second resource, a second quantity of antenna ports, a second scrambling identifier, a second code division multiplexing type a second set of power control offsets, a second transmission configuration indication state, a second periodicity and offset, a second density, or any combination thereof. Such parameters for each CSI-RS resource may be configured to be the same, or different, as described herein with reference to FIG. 2.

At 415, the network entity 105-*b* may transmit, to the UE 115-*b*, the first CSI-RS via the first resource. In some examples, at 425, the UE 115-*b* may obtain the first CSI for the non-SBFD operations and second CSI for the SBFD operations based on measuring the first CSI-RS (e.g., common CSI-RS) as described herein. Alternatively, at 420, the network entity 105-*b* may transmit, in addition to the first CSI-RS, the second CSI-RS. As such, at 425, the UE 115-*b* may obtain the first CSI for the non-SBFD operations using the first CSI-RS and measure the second CSI for the SBFD operations using the second CSI-RS.

At 430, the UE 115-*b* may transmit a first measurement report (e.g., CSI report 215-*a*) that includes the first CSI, the second CSI, or both. That is, the first measurement report may be an example of a single measurement report that multiplexes the first CSI and the second CSI. Alternatively, the first measurement report may include the first CSI. At 435, if the first measurement report includes the first CSI, then the UE 115-*b* may transmit a second CSI report (e.g., CSI report 215-*b*) indicating the second CSI.

Figure 5:
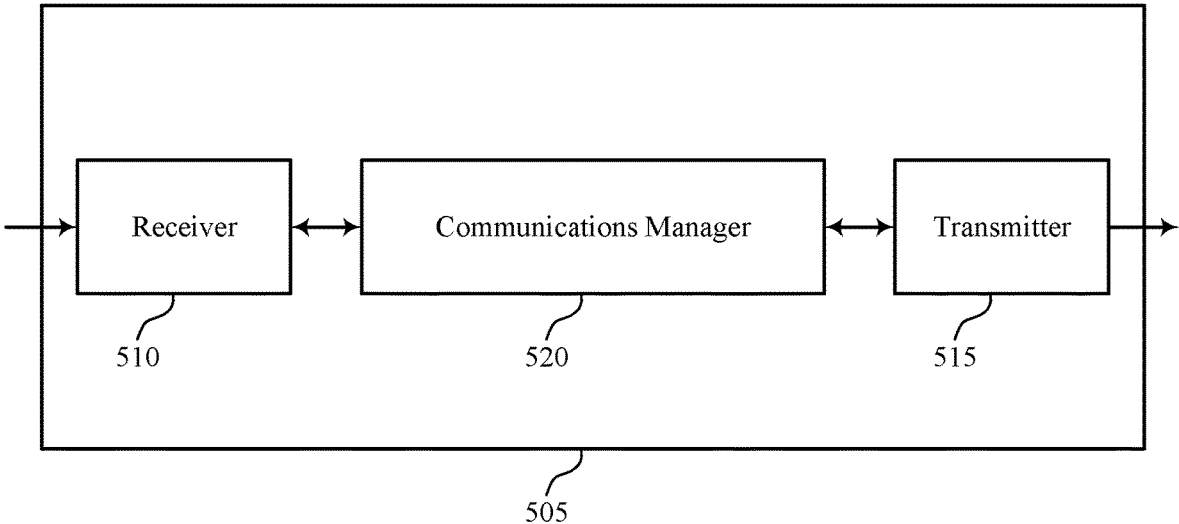
FIGS. 5 and 6 show block diagrams of devices that support channel estimation for full-duplex and half-duplex slots in accordance with one or more aspects of the present disclosure.

FIG. 5 shows a block diagram 500 of a device 505 that supports channel estimation for full-duplex and half-duplex slots in accordance with one or more aspects of the present disclosure. The device 505 may be an example of aspects of a UE 115 as described herein. The device 505 may include a receiver 510, a transmitter 515, and a communications manager 520. The device 505 may also include a processor.

Each of these components may be in communication with one another (e.g., via one or more buses).

The receiver 510 may provide a means for receiving information such as packets, user data, control information, or any combination thereof associated with various information channels (e.g., control channels, data channels, information channels related to channel estimation for full-duplex and half-duplex slots). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to channel estimation for full-duplex and half-duplex slots). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of channel estimation for full-duplex and half-duplex slots as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 is capable of, configured to, or operable to support a means for receiving a control message that indicates a first resource for a first reference signal and a second resource for a second reference signal, the first resource associated with first CSI for half-duplex operations and the second resource associated with second CSI for full-duplex operations. The communications manager 520 is capable of, configured to, or operable to support a means for receiving at least one of the first reference signal or the second reference signal in accordance with the control message. The communications manager 520 is capable of, configured to, or operable to support a means for measuring at least one of the first reference signal or the second reference signal to obtain the first CSI for the half-duplex operations and the second CSI for the full-duplex operations. The communications manager 520 is capable of, configured to, or operable to support a means for transmitting at least one measurement report that includes the first CSI and the second CSI based on the measuring.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for to obtain both first CSI for full-duplex operations and second CSI for half-duplex operations based on a common, or single, CSI-RS, thereby enabling more efficient utilization of communication resources.

Figure 6:
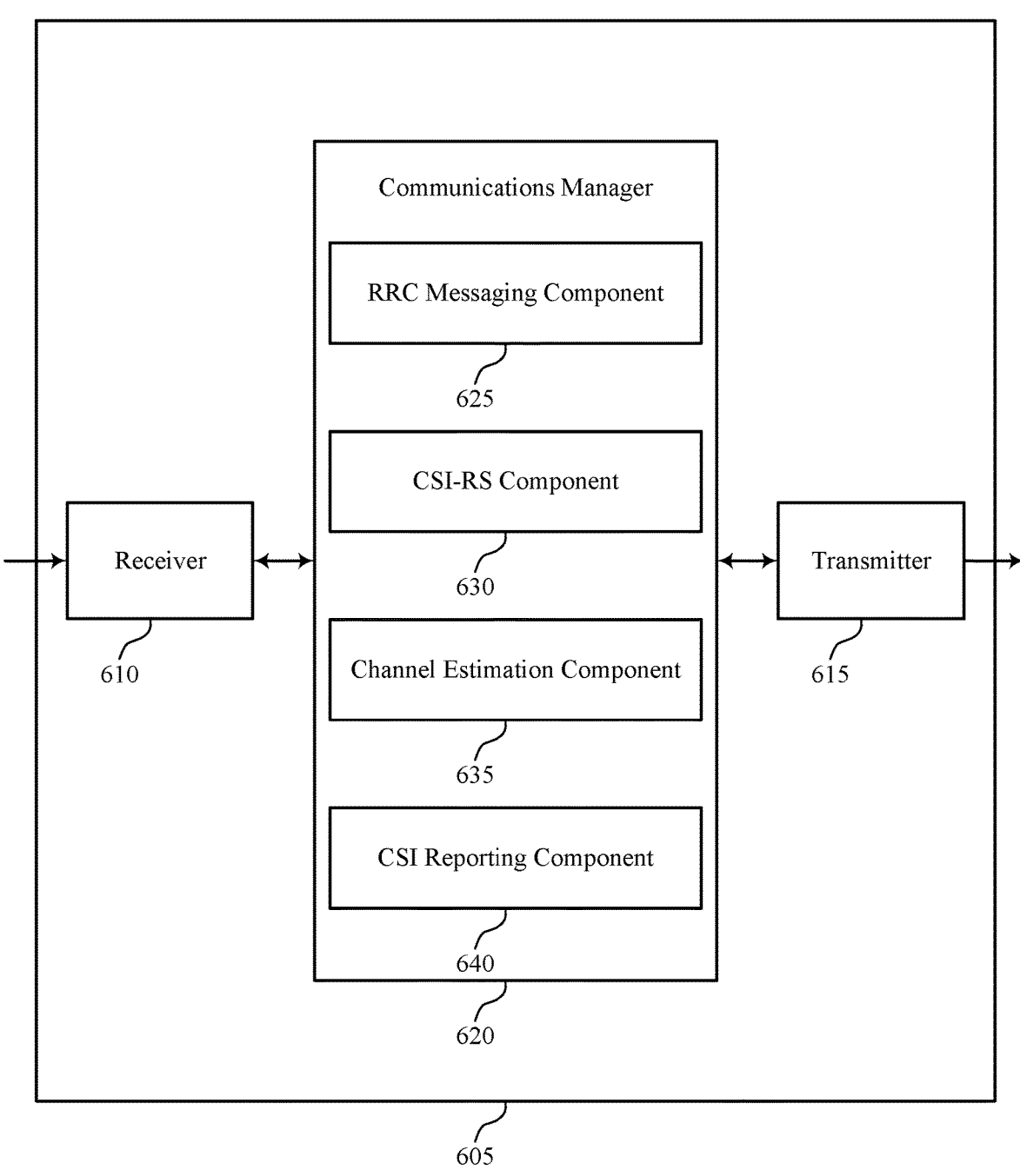

FIG. 6 shows a block diagram 600 of a device 605 that supports channel estimation for full-duplex and half-duplex slots in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel estimation for full-duplex and half-duplex slots). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel estimation for full-duplex and half-duplex slots). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of channel estimation for full-duplex and half-duplex slots as described herein. For example, the communications manager 620 may include an RRC messaging component 625, a CSI-RS component 630, a channel estimation component 635, a CSI reporting component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The RRC messaging component 625 is capable of, configured to, or operable to support a means for receiving a control message that indicates a first resource for a first reference signal and a second resource for a second reference signal, the first resource associated with first CSI for half-duplex operations and the second resource associated with second CSI for full-duplex operations. The CSI-RS component 630 is capable of, configured to, or operable to support a means for receiving at least one of the first reference signal or the second reference signal in accordance with the control message. The channel estimation component 635 is capable of, configured to, or operable to support a means for measuring at least one of the first reference signal or the second reference signal to obtain the first CSI for the half-duplex operations and the second CSI for the full-duplex operations. The CSI reporting component 640 is capable of, configured to, or operable to support a means for transmitting at least one measurement report that includes the first CSI and the second CSI based on the measuring.

Figure 7:
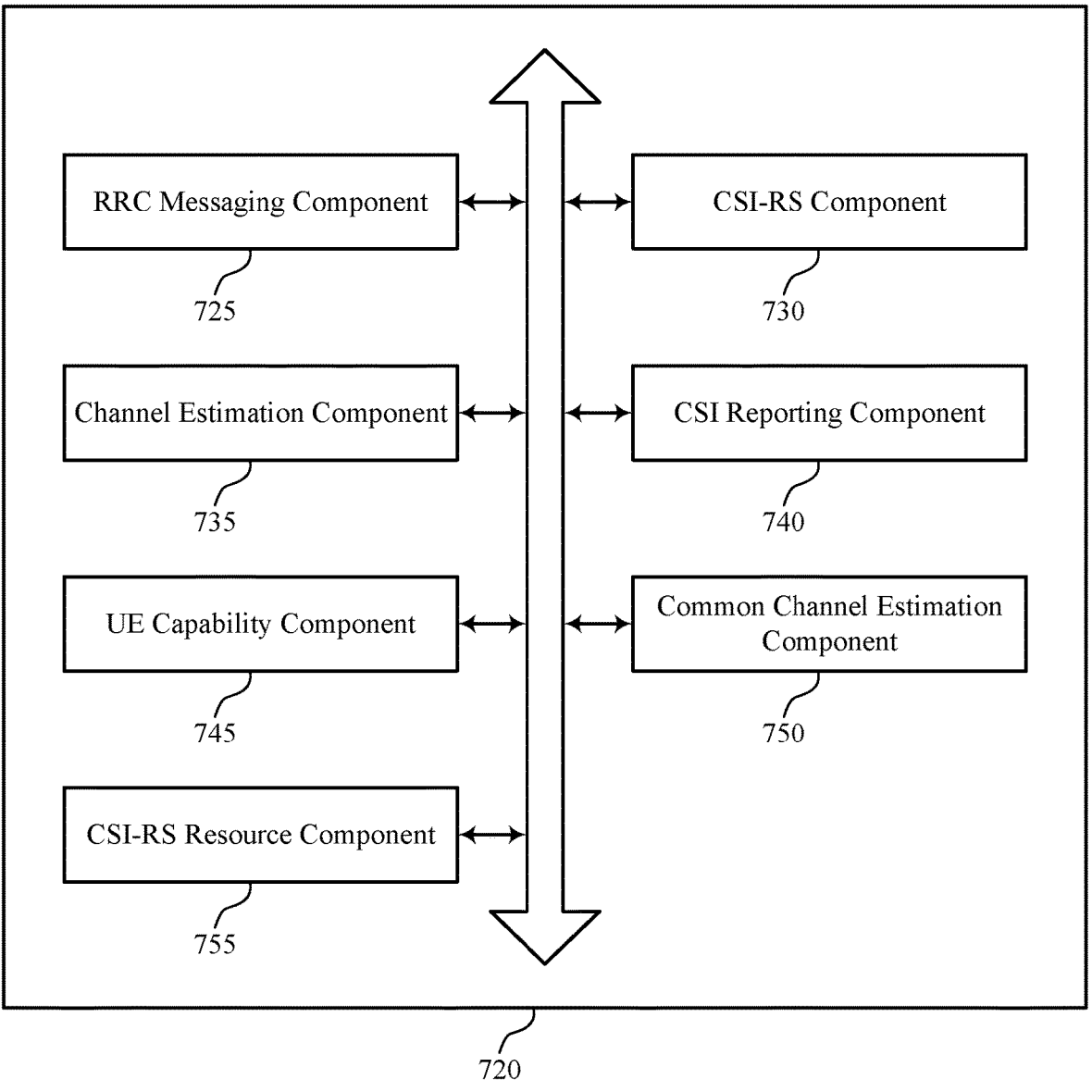
FIG. 7 shows a block diagram of a communications manager that supports channel estimation for full-duplex and half-duplex slots in accordance with one or more aspects of the present disclosure.

FIG. 7 shows a block diagram 700 of a communications manager 720 that supports channel estimation for full-duplex and half-duplex slots in accordance with one or more aspects of the present disclosure. The communications manager 720 may be an example of aspects of a communications manager 520, a communications manager 620, or both, as described herein. The communications manager 720, or various components thereof, may be an example of means for performing various aspects of channel estimation for full-duplex and half-duplex slots as described herein. For example, the communications manager 720 may include an RRC messaging component 725, a CSI-RS component 730, a channel estimation component 735, a CSI reporting component 740, a UE capability component 745, a common channel estimation component 750, a CSI-RS resource component 755, or any combination thereof. Each of these components may communicate, directly or indirectly, with one another (e.g., via one or more buses).

The communications manager 720 may support wireless communications at a UE in accordance with examples as disclosed herein. The RRC messaging component 725 is capable of, configured to, or operable to support a means for receiving a control message that indicates a first resource for a first reference signal and a second resource for a second reference signal, the first resource associated with first CSI for half-duplex operations and the second resource associated with second CSI for full-duplex operations. The CSI-RS component 730 is capable of, configured to, or operable to support a means for receiving at least one of the first reference signal or the second reference signal in accordance with the control message. The channel estimation component 735 is capable of, configured to, or operable to support a means for measuring at least one of the first reference signal or the second reference signal to obtain the first CSI for the half-duplex operations and the second CSI for the full-duplex operations. The CSI reporting component 740 is capable of, configured to, or operable to support a means for transmitting at least one measurement report that includes the first CSI and the second CSI based on the measuring.

In some examples, to support receiving the control message, the RRC messaging component 725 is capable of, configured to, or operable to support a means for receiving a first measurement configuration for the first resource and a second measurement configuration for the second resource, where receiving at least one of the first reference signal or the second reference signal is based on the first measurement configuration, the second measurement configuration, or both.

In some examples, to support receiving the control message, the RRC messaging component 725 is capable of, configured to, or operable to support a means for receiving a measurement configuration that indicates a first resource set and a second resource set, the first resource set including the first resource and the second resource set including the second resource, where receiving at least one of the first reference signal or the second reference signal is based on the measurement configuration.

In some examples, the measurement configuration includes an information element indicating a correspondence between the first resource set and the second resource set.

In some examples, to support receiving the control message, the RRC messaging component 725 is capable of, configured to, or operable to support a means for receiving a measurement configuration that indicates a first resource set, the first resource set including the first resource and the second resource, where receiving at least one of the first reference signal or the second reference signal is based on the measurement configuration.

In some examples, the UE capability component 745 is capable of, configured to, or operable to support a means for transmitting a message indicating a capability of the UE to measure the first CSI and the second CSI using the first reference signal, where receiving the control message is based on the capability.

In some examples, the message further indicates a threshold quantity of active reference signals supported at the UE, a threshold quantity of active antenna ports supported at the UE, or any combination thereof.

In some examples, to support transmitting the at least one measurement report, the CSI reporting component 740 is capable of, configured to, or operable to support a means for transmitting a first measurement report that includes the first CSI. In some examples, to support transmitting the at least one measurement report, the CSI reporting component 740 is capable of, configured to, or operable to support a means for transmitting a second measurement report that includes the second CSI.

In some examples, to support transmitting the at least one measurement report, the CSI reporting component 740 is capable of, configured to, or operable to support a means for transmitting a single measurement report that includes the first CSI and the second CSI.

In some examples, to support measuring at least one of the first reference signal or the second reference signal, the common channel estimation component 750 is capable of, configured to, or operable to support a means for measuring the first reference signal to obtain the first CSI for the half-duplex operations and the second CSI for the full-duplex operations.

In some examples, to support measuring at least one of the first reference signal or the second reference signal, the channel estimation component 735 is capable of, configured to, or operable to support a means for measuring the first reference signal to obtain the first CSI for the half-duplex operations. In some examples, to support measuring at least one of the first reference signal or the second reference signal, the channel estimation component 735 is capable of, configured to, or operable to support a means for measuring the second reference signal to obtain the second CSI for the full-duplex operations.

In some examples, to support receiving the control message, the CSI-RS resource component 755 is capable of, configured to, or operable to support a means for receiving, for the first resource, an indication of a first quantity of antenna ports, a first scrambling ID, a first CDM type a first set of power control offsets, a first TCI state, a first periodicity and offset, a first density, or any combination thereof. In some examples, to support receiving the control message, the CSI-RS resource component 755 is capable of, configured to, or operable to support a means for receiving, for the second resource, an indication of a second quantity of antenna ports, a second scrambling ID, a second CDM type a second set of power control offsets, a second TCI state, a second periodicity and offset, a second density, or any combination thereof.

In some examples, the measuring is based on the second quantity of antenna ports being a subset of the first quantity of antenna ports.

In some examples, the measuring is based on the second quantity of antenna ports being equivalent to the first quantity of antenna ports and the first set of power control offsets being greater than the second set of power control offsets.

In some examples, the measuring is based on the first scrambling ID being equivalent to the second scrambling ID.

In some examples, the measuring is based on the first CDM type being equivalent to the second CDM type.

In some examples, the measuring is based on the first set of power control offsets being equivalent to the second set of power control offsets.

In some examples, the measuring is based on the first TCI state being different from the second TCI state.

In some examples, the measuring is based on the first periodicity and offset being different from the second periodicity and offset.

In some examples, the measuring is based on the first density being different from the second density.

In some examples, the measuring is based on a second CDM group of the second resource being a subset of a first CDM group of the first resource.

In some examples, the measuring is based on one or more first time symbols and one or more first resource elements of the first resource being equivalent to one or more second time symbols and one or more second resource elements of the second resource.

In some examples, the measuring is based on one or more first time symbols of the first resource being different from one or more second time symbols of the second resource, the one or more first time symbols and the one or more second time symbols being in a same transmission slot.

In some examples, the measuring is based on a first transmission time slot of the first resource being adjacent to a second transmission time slot of the second resource.

Figure 8:
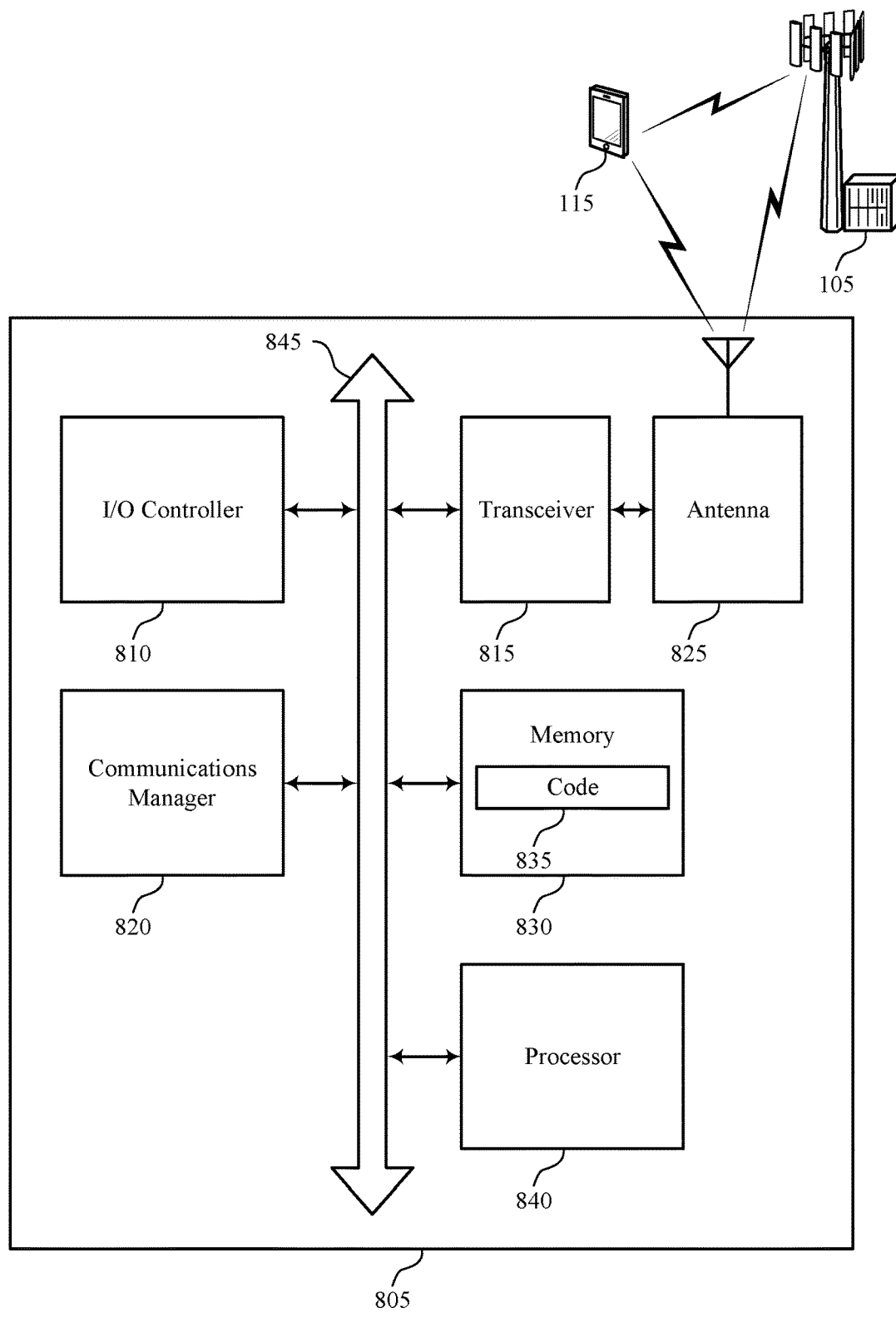
FIG. 8 shows a diagram of a system including a device that supports channel estimation for full-duplex and half-duplex slots in accordance with one or more aspects of the present disclosure.

FIG. 8 shows a diagram of a system 800 including a device 805 that supports channel estimation for full-duplex and half-duplex slots in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting channel estimation for full-duplex and half-duplex slots). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 is capable of, configured to, or operable to support a means for receiving a control message that indicates a first resource for a first reference signal and a second resource for a second reference signal, the first resource associated with first CSI for half-duplex operations and the second resource associated with second CSI for full-duplex operations. The communications manager 820 is capable of, configured to, or operable to support a means for receiving at least one of the first reference signal or the second reference signal in accordance with the control message. The communications manager 820 is capable of, configured to, or operable to support a means for measuring at least one of the first reference signal or the second reference signal to obtain the first CSI for the half-duplex operations and the second CSI for the full-duplex operations. The communications manager 820 is capable of, configured to, or operable to support a means for transmitting at least one measurement report that includes the first CSI and the second CSI based on the measuring.

By including or configuring the communications manager 820 in accordance with examples as described herein, the device 805 may support techniques for to obtain both first CSI for full-duplex operations and second CSI for half-duplex operations based on a common, or single, CSI-RS, which may result in improved communication reliability, a more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of channel estimation for full-duplex and half-duplex slots as described herein, or the processor 840 and the memory 830 may be otherwise configured to perform or support such operations.

Figure 9:
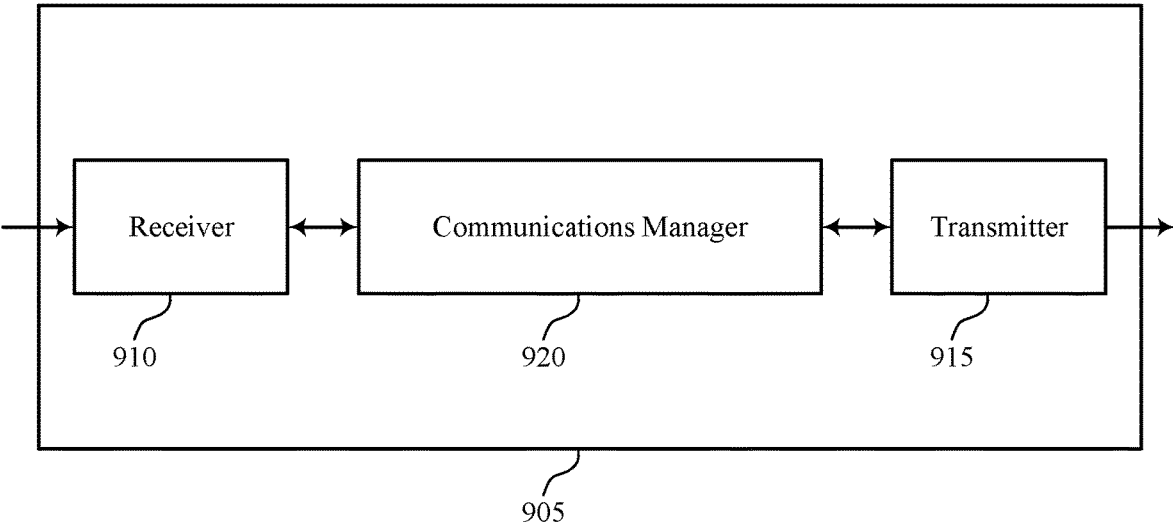
FIGS. 9 and 10 show block diagrams of devices that support channel estimation for full-duplex and half-duplex slots in accordance with one or more aspects of the present disclosure.

FIG. 9 shows a block diagram 900 of a device 905 that supports channel estimation for full-duplex and half-duplex slots in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of channel estimation for full-duplex and half-duplex slots as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 is capable of, configured to, or operable to support a means for transmitting a control message that indicates a first resource for a first reference signal and a second resource for a second reference signal, the first resource associated with first CSI for half-duplex operations and the second resource associated with second CSI for full-duplex operations. The communications manager 920 is capable of, configured to, or operable to support a means for transmitting at least one of the first reference signal or the second reference signal in accordance with the control message. The communications manager 920 is capable of, configured to, or operable to support a means for receiving at least one measurement report that includes the first CSI for the half-duplex operations and the second CSI for the full-duplex operations based on transmitting at least one of the first reference signal or the second reference signal.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for to obtain both first CSI for full-duplex operations and second CSI for half-duplex operations based on a common, or single, CSI-RS, which may result in a more efficient utilization of communication resources.

Figure 10:
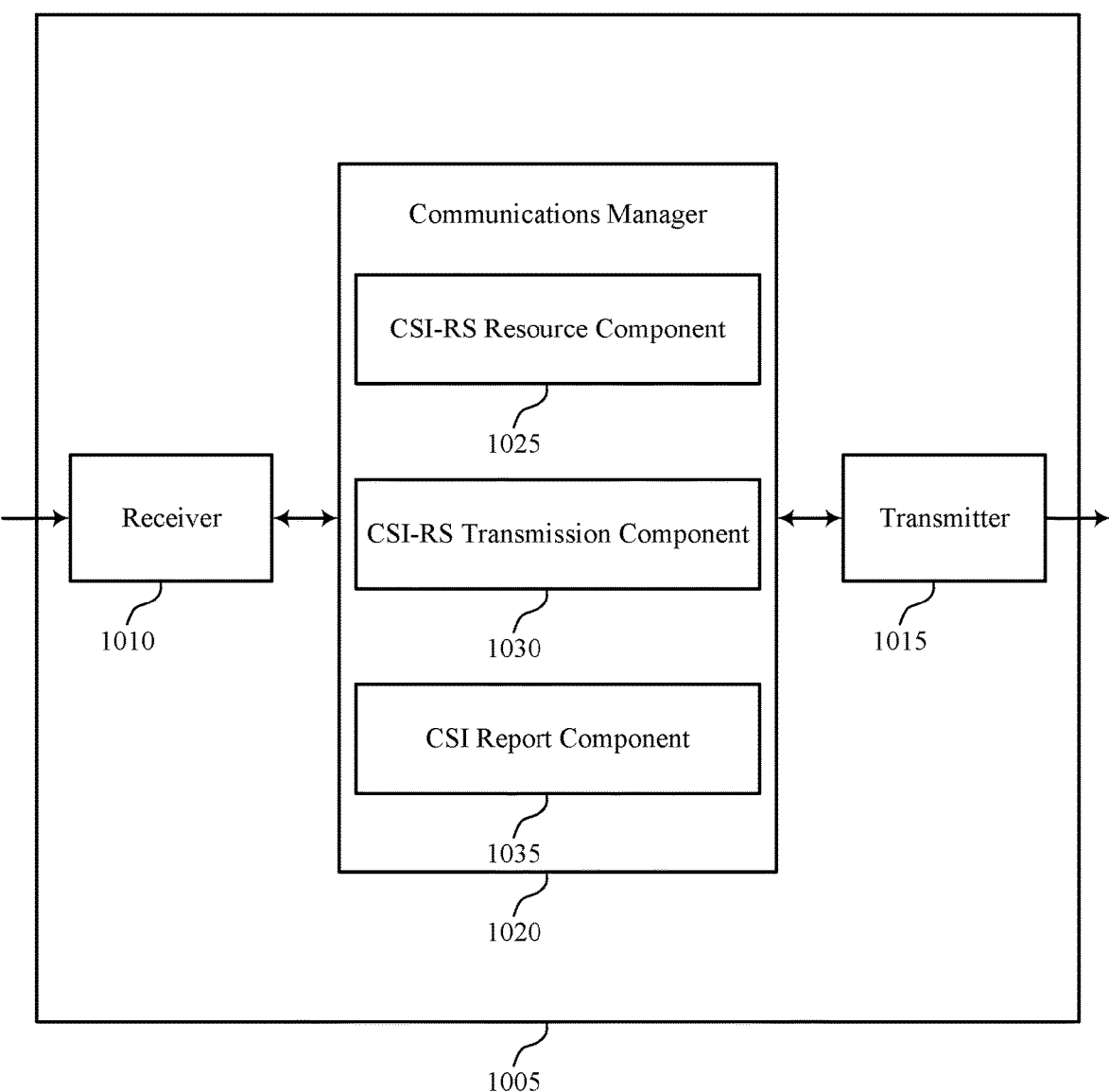

FIG. 10 shows a block diagram 1000 of a device 1005 that supports channel estimation for full-duplex and half-duplex slots in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of channel estimation for full-duplex and half-duplex slots as described herein. For example, the communications manager 1020 may include a CSI-RS resource component 1025, a CSI-RS transmission component 1030, a CSI report component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The CSI-RS resource component 1025 is capable of, configured to, or operable to support a means for transmitting a control message that indicates a first resource for a first reference signal and a second resource for a second reference signal, the first resource associated with first CSI for half-duplex operations and the second resource associated with second CSI for full-duplex operations. The CSI-RS transmission component 1030 is capable of, configured to, or operable to support a means for transmitting at least one of the first reference signal or the second reference signal in accordance with the control message. The CSI report component 1035 is capable of, configured to, or operable to support a means for receiving at least one measurement report that includes the first CSI for the half-duplex operations and the second CSI for the full-duplex operations based on transmitting at least one of the first reference signal or the second reference signal.

Figure 11:
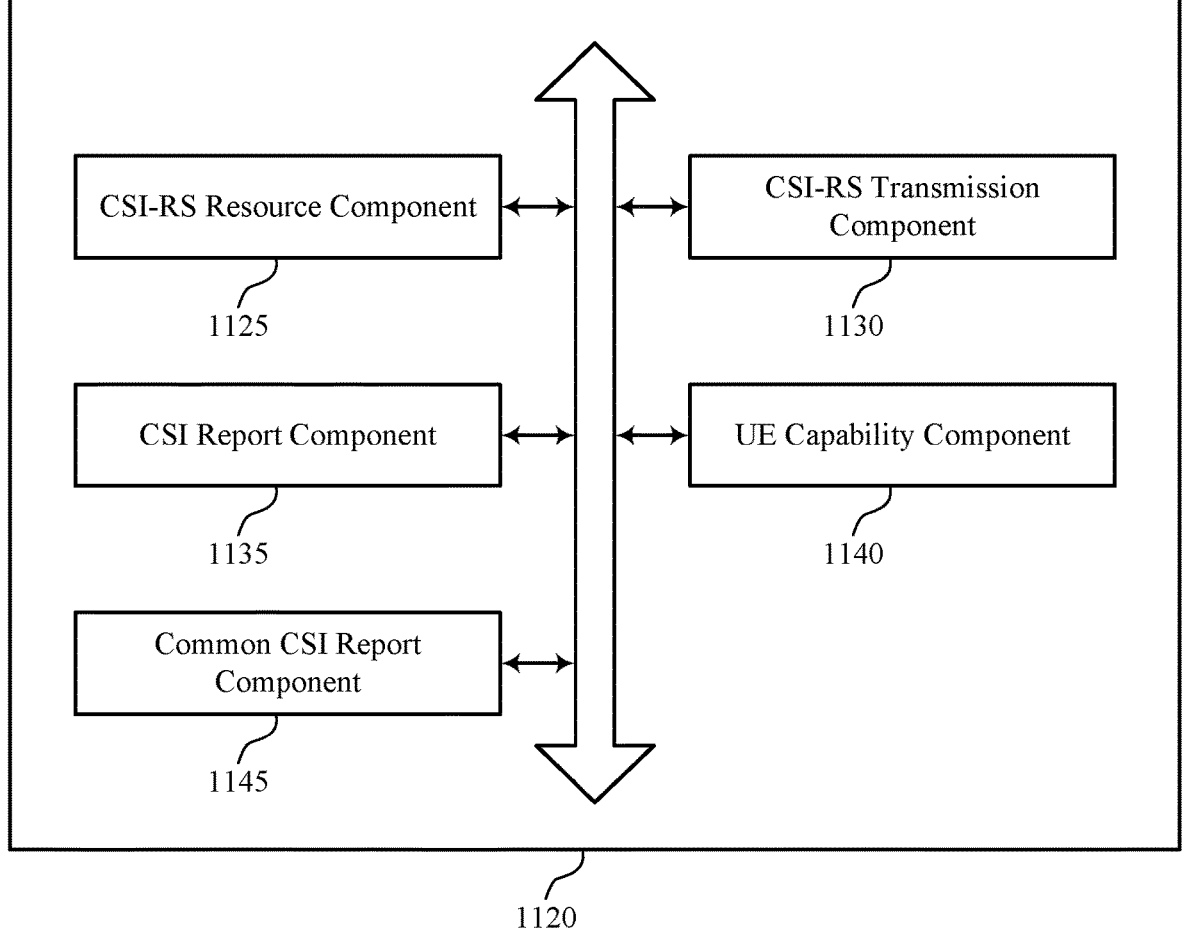
FIG. 11 shows a block diagram of a communications manager that supports channel estimation for full-duplex and half-duplex slots in accordance with one or more aspects of the present disclosure.

FIG. 11 shows a block diagram 1100 of a communications manager 1120 that supports channel estimation for full-duplex and half-duplex slots in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of channel estimation for full-duplex and half-duplex slots as described herein. For example, the communications manager 1120 may include a CSI-RS resource component 1125, a CSI-RS transmission component 1130, a CSI report component 1135, a UE capability component 1140, a common CSI report component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The CSI-RS resource component 1125 is capable of, configured to, or operable to support a means for transmitting a control message that indicates a first resource for a first reference signal and a second resource for a second reference signal, the first resource associated with first CSI for half-duplex operations and the second resource associated with second CSI for full-duplex operations. The CSI-RS transmission component 1130 is capable of, configured to, or operable to support a means for transmitting at least one of the first reference signal or the second reference signal in accordance with the control message. The CSI report component 1135 is capable of, configured to, or operable to support a means for receiving at least one measurement report that includes the first CSI for the half-duplex operations and the second CSI for the full-duplex operations based on transmitting at least one of the first reference signal or the second reference signal.

In some examples, to support transmitting the control message, the CSI-RS resource component 1125 is capable of, configured to, or operable to support a means for transmitting a first measurement configuration for the first resource and a second measurement configuration for the second resource, where transmitting at least one of the first reference signal or the second reference signal is based on the first measurement configuration, the second measurement configuration, or both.

In some examples, to support transmitting the control message, the CSI-RS resource component 1125 is capable of, configured to, or operable to support a means for transmitting a measurement configuration that indicates a first resource set and a second resource set, the first resource set including the first resource and the second resource set including the second resource, where transmitting at least one of the first reference signal or the second reference signal is based on the measurement configuration.

In some examples, the measurement configuration includes an information element indicating a correspondence between the first resource set and the second resource set.

In some examples, to support transmitting the control message, the CSI-RS resource component 1125 is capable of, configured to, or operable to support a means for transmitting a measurement configuration that indicates a first resource set, the first resource set including the first resource and the second resource, where transmitting at least one of the first reference signal or the second reference signal is based on the measurement configuration.

In some examples, the UE capability component 1140 is capable of, configured to, or operable to support a means for receiving a message indicating a capability of a UE to measure the first CSI and the second CSI using the first reference signal, where transmitting the control message is based on the capability.

In some examples, the message further indicates a threshold quantity of active reference signals supported at the UE, a threshold quantity of active antenna ports supported at the UE, or any combination thereof.

In some examples, to support receiving the at least one measurement report, the CSI report component 1135 is capable of, configured to, or operable to support a means for receiving a first measurement report that includes the first CSI. In some examples, to support receiving the at least one measurement report, the CSI report component 1135 is capable of, configured to, or operable to support a means for receiving a second measurement report that includes the second CSI.

In some examples, to support receiving the at least one measurement report, the common CSI report component 1145 is capable of, configured to, or operable to support a means for receiving a single measurement report that includes the first CSI and the second CSI.

In some examples, the first CSI for the half-duplex operations and the second CSI for the full-duplex operations are based on a measurement of the first reference signal.

In some examples, the first CSI for the half-duplex operations is based on the first reference signal and the second CSI for the full-duplex operations is based on a measurement of the second reference signal.

In some examples, to support transmitting the control message, the CSI-RS resource component 1125 is capable of, configured to, or operable to support a means for transmitting, for the first resource, an indication of a first quantity of antenna ports, a first scrambling ID, a first CDM type a first set of power control offsets, a first TCI state, a first periodicity and offset, a first density, or any combination thereof. In some examples, to support transmitting the control message, the CSI-RS resource component 1125 is capable of, configured to, or operable to support a means for transmitting, for the second resource, an indication of a second quantity of antenna ports, a second scrambling ID, a second CDM type a second set of power control offsets, a second TCI state, a second periodicity and offset, a second density, or any combination thereof.

In some examples, the second quantity of antenna ports are a subset of the first quantity of antenna ports.

In some examples, the second quantity of antenna ports are equivalent to the first quantity of antenna ports and the first set of power control offsets are greater than the second set of power control offsets.

In some examples, the first scrambling ID is equivalent to the second scrambling ID.

In some examples, the first CDM type is equivalent to the second CDM type.

In some examples, the first set of power control offsets is equivalent to the second set of power control offsets.

In some examples, the first TCI state is different from the second TCI state.

In some examples, the first periodicity and offset is different from the second periodicity and offset.

In some examples, the first density is different from the second density.

In some examples, a second CDM group of the second resource is a subset of a first CDM group of the first resource.

In some examples, one or more first time symbols and one or more first resource elements of the first resource are equivalent to one or more second time symbols and one or more second resource elements of the second resource.

In some examples, one or more first time symbols of the first resource is different from one or more second time symbols of the second resource, the one or more first time symbols and the one or more second time symbols being in a same transmission slot.

In some examples, a first transmission time slot of the first resource is adjacent to a second transmission time slot of the second resource.

Figure 12:
FIG. 12 shows a diagram of a system including a device that supports channel estimation for full-duplex and half-duplex slots in accordance with one or more aspects of the present disclosure.

FIG. 12 shows a diagram of a system 1200 including a device 1205 that supports channel estimation for full-duplex and half-duplex slots in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting channel estimation for full-duplex and half-duplex slots). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 is capable of, configured to, or operable to support a means for transmitting a control message that indicates a first resource for a first reference signal and a second resource for a second reference signal, the first resource associated with first CSI for half-duplex operations and the second resource associated with second CSI for full-duplex operations. The communications manager 1220 is capable of, configured to, or operable to support a means for transmitting at least one of the first reference signal or the second reference signal in accordance with the control message. The communications manager 1220 is capable of, configured to, or operable to support a means for receiving at least one measurement report that includes the first CSI for the half-duplex operations and the second CSI for the full-duplex operations based on transmitting at least one of the first reference signal or the second reference signal.

By including or configuring the communications manager 1220 in accordance with examples as described herein, the device 1205 may support techniques for to obtain both first CSI for full-duplex operations and second CSI for half-duplex operations based on a common, or single, CSI-RS, which may result in improved communication reliability, a more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of channel estimation for full-duplex and half-duplex slots as described herein, or the processor 1235 and the memory 1225 may be otherwise configured to perform or support such operations.

FIG. 13 shows a flowchart illustrating a method 1300 that supports channel estimation for full-duplex and half-duplex slots in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a control message that indicates a first resource for a first reference signal and a second resource for a second reference signal, the first resource associated with first CSI for half-duplex operations and the second resource associated with second CSI for full-duplex operations. The operations of block 1305 may be performed in accordance with examples as disclosed herein. In some examples, aspects of the operations of 1305 may be performed by an RRC messaging component 725 as described with reference to FIG. 7.

At 1310, the method may include receiving at least one of the first reference signal or the second reference signal in accordance with the control message. The operations of block 1310 may be performed in accordance with examples as disclosed herein. In some examples, aspects of the operations of 1310 may be performed by a CSI-RS component 730 as described with reference to FIG. 7.

At 1315, the method may include measuring at least one of the first reference signal or the second reference signal to obtain the first CSI for the half-duplex operations and the second CSI for the full-duplex operations. The operations of block 1315 may be performed in accordance with examples as disclosed herein. In some examples, aspects of the operations of 1315 may be performed by a channel estimation component 735 as described with reference to FIG. 7.

At 1320, the method may include transmitting at least one measurement report that includes the first CSI and the second CSI based on the measuring. The operations of block 1320 may be performed in accordance with examples as disclosed herein. In some examples, aspects of the operations of 1320 may be performed by a CSI reporting component 740 as described with reference to FIG. 7.

FIG. 14 shows a flowchart illustrating a method 1400 that supports channel estimation for full-duplex and half-duplex slots in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a message indicating a capability of the UE to measure first CSI and second CSI using a first reference signal. The operations of block 1405 may be performed in accordance with examples as disclosed herein. In some examples, aspects of the operations of 1405 may be performed by a UE capability component 745 as described with reference to FIG. 7.

At 1410, the method may include receiving a control message that indicates a first resource for the first reference signal and a second resource for a second reference signal, the first resource associated with the first CSI for half-duplex operations and the second resource associated with the second CSI for full-duplex operations, where receiving the control message is based on the capability. The operations of block 1410 may be performed in accordance with examples as disclosed herein. In some examples, aspects of the operations of 1410 may be performed by an RRC messaging component 725 as described with reference to FIG. 7.

At 1415, the method may include receiving at least one of the first reference signal or the second reference signal in accordance with the control message. The operations of block 1415 may be performed in accordance with examples as disclosed herein. In some examples, aspects of the operations of 1415 may be performed by a CSI-RS component 730 as described with reference to FIG. 7.

At 1420, the method may include measuring at least one of the first reference signal or the second reference signal to obtain the first CSI for the half-duplex operations and the second CSI for the full-duplex operations. The operations of block 1420 may be performed in accordance with examples as disclosed herein. In some examples, aspects of the operations of 1420 may be performed by a channel estimation component 735 as described with reference to FIG. 7.

At 1425, the method may include transmitting at least one measurement report that includes the first CSI and the second CSI based on the measuring. The operations of block 1425 may be performed in accordance with examples as disclosed herein. In some examples, aspects of the operations of 1425 may be performed by a CSI reporting component 740 as described with reference to FIG. 7.

FIG. 15 shows a flowchart illustrating a method 1500 that supports channel estimation for full-duplex and half-duplex slots in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a control message that indicates a first resource for a first reference signal and a second resource for a second reference signal, the first resource associated with first CSI for half-duplex operations and the second resource associated with second CSI for full-duplex operations. The operations of block 1505 may be performed in accordance with examples as disclosed herein. In some examples, aspects of the operations of 1505 may be performed by a CSI-RS resource component 1125 as described with reference to FIG. 11.

At 1510, the method may include transmitting at least one of the first reference signal or the second reference signal in accordance with the control message. The operations of block 1510 may be performed in accordance with examples as disclosed herein. In some examples, aspects of the operations of 1510 may be performed by a CSI-RS transmission component 1130 as described with reference to FIG. 11.

At 1515, the method may include receiving at least one measurement report that includes the first CSI for the half-duplex operations and the second CSI for the full-duplex operations based on transmitting at least one of the first reference signal or the second reference signal. The operations of block 1515 may be performed in accordance with examples as disclosed herein. In some examples, aspects of the operations of 1515 may be performed by a CSI report component 1135 as described with reference to FIG. 11.

Figure 16:
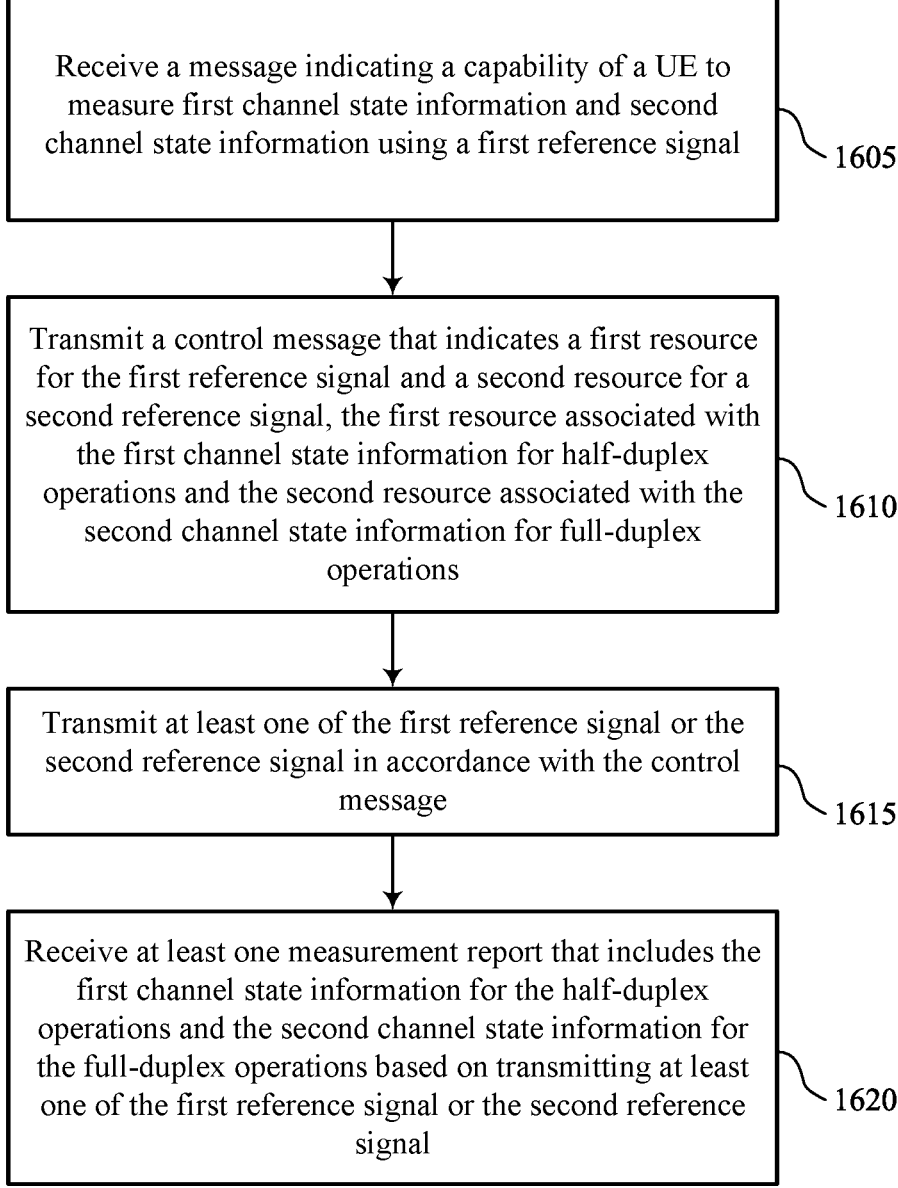

FIG. 16 shows a flowchart illustrating a method 1600 that supports channel estimation for full-duplex and half-duplex slots in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving a message indicating a capability of a UE to measure first CSI and second CSI using a first reference signal. The operations of block 1605 may be performed in accordance with examples as disclosed herein. In some examples, aspects of the operations of 1605 may be performed by a UE capability component 1140 as described with reference to FIG. 11.

At 1610, the method may include transmitting a control message that indicates a first resource for the first reference signal and a second resource for a second reference signal, the first resource associated with the first CSI for half-duplex operations and the second resource associated with the second CSI for full-duplex operations, where transmitting the control message is based on the capability. The operations of block 1610 may be performed in accordance with examples as disclosed herein. In some examples, aspects of the operations of 1610 may be performed by a CSI-RS resource component 1125 as described with reference to FIG. 11.

At 1615, the method may include transmitting at least one of the first reference signal or the second reference signal in accordance with the control message. The operations of block 1615 may be performed in accordance with examples as disclosed herein. In some examples, aspects of the operations of 1615 may be performed by a CSI-RS transmission component 1130 as described with reference to FIG. 11.

At 1620, the method may include receiving at least one measurement report that includes the first CSI for the half-duplex operations and the second CSI for the full-duplex operations based on transmitting at least one of the first reference signal or the second reference signal. The operations of block 1620 may be performed in accordance with examples as disclosed herein. In some examples, aspects of the operations of 1620 may be performed by a CSI report component 1135 as described with reference to FIG. 11.

The following provides an overview of aspects of the present disclosure:

Aspect 1: A method for wireless communications at a UE, comprising: receiving a control message that indicates a first resource for a first reference signal and a second resource for a second reference signal, the first resource associated with a half-duplex slot type and the second resource associated with a full-duplex slot type; receiving at least one of the first reference signal or the second reference signal in accordance with the control message; measuring at least one of the first reference signal or the second reference signal to obtain first CSI for the half-duplex slot type and second CSI for the full-duplex slot type; and transmitting at least one measurement report that includes the first CSI and the second CSI based at least in part on the measuring.

Aspect 2: The method of aspect 1, wherein receiving the control message further comprises: receiving a first measurement configuration for the first resource and a second measurement configuration for the second resource, wherein receiving at least one of the first reference signal or the second reference signal is based at least in part on the first measurement configuration, the second measurement configuration, or both.

Aspect 3: The method of aspect 1, wherein receiving the control message further comprises: receiving a measurement configuration that indicates a first resource set and a second resource set, the first resource set including the first resource and the second resource set including the second resource, wherein receiving at least one of the first reference signal or the second reference signal is based at least in part on the measurement configuration.

Aspect 4: The method of aspect 3, wherein the measurement configuration includes an information element indicating a correspondence between the first resource set and the second resource set.

Aspect 5: The method of aspect 1, wherein receiving the control message further comprises: receiving a measurement configuration that indicates a first resource set, the first resource set including the first resource and the second resource, wherein receiving at least one of the first reference signal or the second reference signal is based at least in part on the measurement configuration.

Aspect 6: The method of any of aspects 1 through 5, further comprising: transmitting a message indicating a capability of the UE to measure the first CSI and the second CSI using the first reference signal, wherein receiving the control message is based at least in part on the capability.

Aspect 7: The method of aspect 6, wherein the message further indicates a threshold quantity of active reference signals supported at the UE, a threshold quantity of active antenna ports supported at the UE, or a combination thereof.

Aspect 8: The method of any of aspects 1 through 7, wherein transmitting the at least one measurement report further comprises: transmitting a first measurement report that includes the first CSI; and transmitting a second measurement report that includes the second CSI.

Aspect 9: The method of any of aspects 1 through 7, wherein transmitting the at least one measurement report further comprises: transmitting a single measurement report that includes the first CSI and the second CSI.

Aspect 10: The method of any of aspects 1 through 9, wherein measuring at least one of the first reference signal or the second reference signal further comprises: measuring the first reference signal to obtain the first CSI for the half-duplex slot type and the second CSI for the full-duplex slot type.

Aspect 11: The method of any of aspects 1 through 9, wherein measuring at least one of the first reference signal or the second reference signal further comprises: measuring the first reference signal to obtain the first CSI for the half-duplex slot type; and measuring the second reference signal to obtain the second CSI for the full-duplex slot type.

Aspect 12: The method of any of aspects 1 through 11, wherein receiving the control message further comprises: receiving, for the first resource, an indication of a first quantity of antenna ports, a first scrambling ID, a first CDM type a first set of power control offsets, a first transmission configuration indication state, a first periodicity and offset, a first density, or a combination thereof; and receiving, for the second resource, an indication of a second quantity of antenna ports, a second scrambling ID, a second CDM type a second set of power control offsets, a second transmission configuration indication state, a second periodicity and offset, a second density, or a combination thereof.

Aspect 13: The method of aspect 12, wherein the measuring is based at least in part on the second quantity of antenna ports being a subset of the first quantity of antenna ports.

Aspect 14: The method of any of aspects 12 through 13, wherein the measuring is based at least in part on the second quantity of antenna ports being equivalent to the first quantity of antenna ports and the first set of power control offsets being greater than the second set of power control offsets.

Aspect 15: The method of any of aspects 12 through 14, wherein the measuring is based at least in part on the first scrambling ID being equivalent to the second scrambling ID.

Aspect 16: The method of any of aspects 12 through 15, wherein the measuring is based at least in part on the first CDM type being equivalent to the second CDM type.

Aspect 17: The method of any of aspects 12 through 16, wherein the measuring is based at least in part on the first set of power control offsets being equivalent to the second set of power control offsets.

Aspect 18: The method of any of aspects 12 through 17, wherein the measuring is based at least in part on the first transmission configuration indication state being different from the second transmission configuration indication state.

Aspect 19: The method of any of aspects 12 through 18, wherein the measuring is based at least in part on the first periodicity and offset being different from the second periodicity and offset.

Aspect 20: The method of any of aspects 12 through 19, wherein the measuring is based at least in part on the first density being different from the second density.

Aspect 21: The method of any of aspects 1 through 20, wherein the measuring is based at least in part on a second CDM group of the second resource being a subset of a first CDM group of the first resource.

Aspect 22: The method of any of aspects 1 through 21, wherein the measuring is based at least in part on one or more first time symbols and one or more first resource elements of the first resource being equivalent to one or more second time symbols and one or more second resource elements of the second resource.

Aspect 23: The method of any of aspects 1 through 22, wherein the measuring is based at least in part on one or more first time symbols of the first resource being different from one or more second time symbols of the second resource, the one or more first time symbols and the one or more second time symbols being in a same transmission slot.

Aspect 24: The method of any of aspects 1 through 23, wherein the measuring is based at least in part on a first transmission time slot of the first resource being adjacent to a second transmission time slot of the second resource.

Aspect 25: A method for wireless communications at a network entity, comprising: transmitting a control message that indicates a first resource for a first reference signal and a second resource for a second reference signal, the first resource associated with a half-duplex slot type and the second resource associated with a full-duplex slot type; transmitting at least one of the first reference signal or the second reference signal in accordance with the control message; and receiving at least one measurement report that includes first CSI for the half-duplex slot type and second CSI for the full-duplex slot type based at least in part on transmitting at least one of the first reference signal or the second reference signal.

Aspect 26: The method of aspect 25, wherein transmitting the control message further comprises: transmitting a first measurement configuration for the first resource and a second measurement configuration for the second resource, wherein transmitting at least one of the first reference signal or the second reference signal is based at least in part on the first measurement configuration, the second measurement configuration, or both.

Aspect 27: The method of aspect 25, wherein transmitting the control message further comprises: transmitting a measurement configuration that indicates a first resource set and a second resource set, the first resource set including the first resource and the second resource set including the second resource, wherein transmitting at least one of the first reference signal or the second reference signal is based at least in part on the measurement configuration.

Aspect 28: The method of aspect 27, wherein the measurement configuration includes an information element indicating a correspondence between the first resource set and the second resource set.

Aspect 29: The method of aspect 25, wherein transmitting the control message further comprises: transmitting a measurement configuration that indicates a first resource set, the first resource set including the first resource and the second resource, wherein transmitting at least one of the first reference signal or the second reference signal is based at least in part on the measurement configuration.

Aspect 30: The method of any of aspects 25 through 29, further comprising: receiving a message indicating a capability of a UE to measure the first CSI and the second CSI using the first reference signal, wherein transmitting the control message is based at least in part on the capability.

Aspect 31: The method of aspect 30, wherein the message further indicates a threshold quantity of active reference signals supported at the UE, a threshold quantity of active antenna ports supported at the UE, or a combination thereof.

Aspect 32: The method of any of aspects 25 through 31, wherein receiving the at least one measurement report further comprises: receiving a first measurement report that includes the first CSI; and receiving a second measurement report that includes the second CSI.

Aspect 33: The method of any of aspects 25 through 31, wherein receiving the at least one measurement report further comprises: receiving a single measurement report that includes the first CSI and the second CSI.

Aspect 34: The method of any of aspects 25 through 33, wherein the first CSI for the half-duplex slot type and the second CSI for the full-duplex slot type are based at least in part on a measurement of the first reference signal.

Aspect 35: The method of any of aspects 25 through 33, wherein the first CSI for the half-duplex slot type is based at least in part on the first reference signal and the second CSI for the full-duplex slot type is based at least in part on a measurement of the second reference signal.

Aspect 36: The method of any of aspects 25 through 35, wherein transmitting the control message further comprises: transmitting, for the first resource, an indication of a first quantity of antenna ports, a first scrambling ID, a first CDM type a first set of power control offsets, a first transmission configuration indication state, a first periodicity and offset, a first density, or a combination thereof; and transmitting, for the second resource, an indication of a second quantity of antenna ports, a second scrambling ID, a second CDM type a second set of power control offsets, a second transmission configuration indication state, a second periodicity and offset, a second density, or a combination thereof.

Aspect 37: The method of aspect 36, wherein the second quantity of antenna ports are a subset of the first quantity of antenna ports.

Aspect 38: The method of any of aspects 36 through 37, wherein the second quantity of antenna ports are equivalent to the first quantity of antenna ports and the first set of power control offsets are greater than the second set of power control offsets.

Aspect 39: The method of any of aspects 36 through 38, wherein the first scrambling ID is equivalent to the second scrambling ID.

Aspect 40: The method of any of aspects 36 through 39, wherein the first CDM type is equivalent to the second CDM type.

Aspect 41: The method of any of aspects 36 through 40, wherein the first set of power control offsets is equivalent to the second set of power control offsets.

Aspect 42: The method of any of aspects 36 through 41, wherein the first transmission configuration indication state is different from the second transmission configuration indication state.

Aspect 43: The method of any of aspects 36 through 42, wherein the first periodicity and offset is different from the second periodicity and offset.

Aspect 44: The method of any of aspects 36 through 43, wherein the first density is different from the second density.

Aspect 45: The method of any of aspects 25 through 44, wherein a second CDM group of the second resource is a subset of a first CDM group of the first resource.

Aspect 46: The method of any of aspects 25 through 45, wherein one or more first time symbols and one or more first resource elements of the first resource are equivalent to one or more second time symbols and one or more second resource elements of the second resource.

Aspect 47: The method of any of aspects 25 through 46, wherein one or more first time symbols of the first resource is different from one or more second time symbols of the second resource, the one or more first time symbols and the one or more second time symbols being in a same transmission slot.

Aspect 48: The method of any of aspects 25 through 47, wherein a first transmission time slot of the first resource is adjacent to a second transmission time slot of the second resource.

Aspect 49: An apparatus for wireless communications at a UE, comprising a processor; memory coupled with the processor; and instructions stored in the memory and executable by the processor to cause the apparatus to perform a method of any of aspects 1 through 24.

Aspect 50: An apparatus for wireless communications at a UE, comprising at least one means for performing a method of any of aspects 1 through 24.

Aspect 51: A non-transitory computer-readable medium storing code for wireless communications at a UE, the code comprising instructions executable by a processor to perform a method of any of aspects 1 through 24.

Aspect 52: An apparatus for wireless communications at a network entity, comprising a processor; memory coupled with the processor; and instructions stored in the memory and executable by the processor to cause the apparatus to perform a method of any of aspects 25 through 48.

Aspect 53: An apparatus for wireless communications at a network entity, comprising at least one means for performing a method of any of aspects 25 through 48.

Aspect 54: A non-transitory computer-readable medium storing code for wireless communications at a network entity, the code comprising instructions executable by a processor to perform a method of any of aspects 25 through 48.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor;
   at least one memory coupled with the at least one processor; and
   instructions stored in the at least one memory and executable by the at least one processor to cause the apparatus to:
      receive a control message that indicates a first resource for a first reference signal and a second resource for a second reference signal, the first resource associated with first channel state information for half-duplex operations and the second resource associated with second channel state information for full-duplex operations, wherein the second resource and the first resource are overlayed, such that a plurality of resource elements of the second resource comprise a subset of a plurality of resource elements of the first resource;

receive, via at least the subset of the plurality of resource elements of the first resource, at least one of the first reference signal or the second reference signal in accordance with the control message;

measure at least one of the first reference signal or the second reference signal to obtain the first channel state information for the half-duplex operations and the second channel state information for the full-duplex operations; and transmit at least one measurement report that includes the first channel state information and the second channel state information based at least in part on the measuring.

2. The apparatus of claim 1, wherein the instructions to receive the control message are further executable by the at least one processor to cause the apparatus to:

receive a first measurement configuration for the first resource and a second measurement configuration for the second resource, wherein receiving at least one of the first reference signal or the second reference signal is based at least in part on the first measurement configuration, the second measurement configuration, or both.

3. The apparatus of claim 1, wherein the instructions to receive the control message are further executable by the at least one processor to cause the apparatus to:

receive a measurement configuration that indicates a first resource set and a second resource set, the first resource set including the first resource and the second resource set including the second resource, wherein receiving at least one of the first reference signal or the second reference signal is based at least in part on the measurement configuration.

4. The apparatus of claim 3, wherein the measurement configuration includes an information element indicating a correspondence between the first resource set and the second resource set.

5. The apparatus of claim 1, wherein the instructions to receive the control message are further executable by the at least one processor to cause the apparatus to:

receive a measurement configuration that indicates a first resource set, the first resource set including the first resource and the second resource, wherein receiving at least one of the first reference signal or the second reference signal is based at least in part on the measurement configuration.

6. The apparatus of claim 1, wherein the instructions are further executable by the at least one processor to cause the apparatus to:

transmit a message indicating a capability of the UE to measure the first channel state information and the second channel state information using the first reference signal, wherein receiving the control message is based at least in part on the capability.

7. The apparatus of claim 6, wherein the message further indicates a threshold quantity of active reference signals supported at the UE, a threshold quantity of active antenna ports supported at the UE, or any combination thereof.

8. The apparatus of claim 1, wherein the instructions to transmit the at least one measurement report are further executable by the at least one processor to cause the apparatus to:

transmit a first measurement report that includes the first channel state information; and transmit a second measurement report that includes the second channel state information.

9. The apparatus of claim 1, wherein the instructions to transmit the at least one measurement report are further executable by the at least one processor to cause the apparatus to:

transmit a single measurement report that includes the first channel state information and the second channel state information.

10. The apparatus of claim 1, wherein the instructions to measure at least one of the first reference signal or the second reference signal are further executable by the at least one processor to cause the apparatus to:

measure the first reference signal to obtain the first channel state information for the half-duplex operations and the second channel state information for the full-duplex operations.

11. The apparatus of claim 1, wherein the instructions to measure at least one of the first reference signal or the second reference signal are further executable by the at least one processor to cause the apparatus to:

measure the first reference signal to obtain the first channel state information for the half-duplex operations; and measure the second reference signal to obtain the second channel state information for the full-duplex operations.

12. The apparatus of claim 1, wherein the instructions to receive the control message are further executable by the at least one processor to cause the apparatus to:

receive, for the first resource, an indication of a first quantity of antenna ports, a first scrambling identifier, a first code division multiplexing type a first set of power control offsets, a first transmission configuration indication state, a first periodicity and offset, a first density, or any combination thereof; and receive, for the second resource, an indication of a second quantity of antenna ports, a second scrambling identifier, a second code division multiplexing type a second set of power control offsets, a second transmission configuration indication state, a second periodicity and offset, a second density, or any combination thereof.

13. The apparatus of claim 12, wherein the measuring is based at least in part on the second quantity of antenna ports being a subset of the first quantity of antenna ports.

14. The apparatus of claim 12, wherein the measuring is based at least in part on the second quantity of antenna ports being equivalent to the first quantity of antenna ports and the first set of power control offsets being greater than the second set of power control offsets.

15. The apparatus of claim 12, wherein the measuring is based at least in part on the first scrambling identifier being equivalent to the second scrambling identifier.

16. The apparatus of claim 12, wherein the measuring is based at least in part on the first code division multiplexing type being equivalent to the second code division multiplexing type.

17. The apparatus of claim 12, wherein the measuring is based at least in part on the first set of power control offsets being equivalent to the second set of power control offsets.

18. The apparatus of claim 12, wherein the measuring is based at least in part on the first transmission configuration indication state being different from the second transmission configuration indication state.

19. The apparatus of claim 12, wherein the measuring is based at least in part on the first periodicity and offset being different from the second periodicity and offset.

20. The apparatus of claim 12, wherein the measuring is based at least in part on the first density being different from the second density.

21. The apparatus of claim 1, wherein the measuring is based at least in part on a second code division multiplexing group of the second resource being a subset of a first code division multiplexing group of the first resource.

22. The apparatus of claim 1, wherein the measuring is based at least in part on one or more first time symbols and one or more first resource elements of the first resource being equivalent to one or more second time symbols and one or more second resource elements of the second resource.

23. The apparatus of claim 1, wherein the measuring is based at least in part on one or more first time symbols of the first resource being different from one or more second time symbols of the second resource, the one or more first time symbols and the one or more second time symbols being in a same transmission slot.

24. The apparatus of claim 1, wherein the measuring is based at least in part on a first transmission time slot of the first resource being adjacent to a second transmission time slot of the second resource.

25. An apparatus for wireless communications at a network entity, comprising:
at least one processor;
at least one memory coupled with the at least one processor; and
instructions stored in the at least one memory and executable by the at least one processor to cause the apparatus to:
transmit a control message that indicates a first resource for a first reference signal and a second resource for a second reference signal, the first resource associated with first channel state information for half-duplex operations and the second resource associated with second channel state information for full-duplex operations, wherein the second resource and the first resource are overlayed, such that a plurality of resource elements of the second resource comprise a subset of a plurality of resource elements of the first resource;
transmit, via at least the subset of the plurality of resource elements of the first resource, at least one of the first reference signal or the second reference signal in accordance with the control message; and
receive at least one measurement report that includes the first channel state information for the half-duplex operations and the second channel state information for the full-duplex operations based at least in part on transmitting at least one of the first reference signal or the second reference signal.

26. The apparatus of claim 25, wherein the instructions to transmit the control message are further executable by the at least one processor to cause the apparatus to:
transmit a first measurement configuration for the first resource and a second measurement configuration for the second resource, wherein transmitting at least one of the first reference signal or the second reference signal is based at least in part on the first measurement configuration, the second measurement configuration, or both.

27. The apparatus of claim 25, wherein the instructions to transmit the control message are further executable by the at least one processor to cause the apparatus to:
transmit a measurement configuration that indicates a first resource set and a second resource set, the first resource set including the first resource and the second resource set including the second resource, wherein transmitting at least one of the first reference signal or the second reference signal is based at least in part on the measurement configuration.

28. The apparatus of claim 27, wherein the measurement configuration includes an information element indicating a correspondence between the first resource set and the second resource set.

29. A method for wireless communications at a user equipment (UE), comprising:
receiving a control message that indicates a first resource for a first reference signal and a second resource for a second reference signal, the first resource associated with first channel state information for half-duplex operations and the second resource associated with second channel state information for full-duplex operations, wherein the second resource and the first resource are overlayed, such that a plurality of resource elements of the second resource comprise a subset of a plurality of resource elements of the first resource;
receiving, via at least the subset of the plurality of resource elements of the first resource, at least one of the first reference signal or the second reference signal in accordance with the control message;
measuring at least one of the first reference signal or the second reference signal to obtain the first channel state information for the half-duplex operations and the second channel state information for the full-duplex operations; and
transmitting at least one measurement report that includes the first channel state information and the second channel state information based at least in part on the measuring.

30. A method for wireless communications at a network entity, comprising:
transmitting a control message that indicates a first resource for a first reference signal and a second resource for a second reference signal, the first resource associated with first channel state information for half-duplex operations and the second resource associated with second channel state information for full-duplex operations, wherein the second resource and the first resource are overlayed, such that a plurality of resource elements of the second resource comprise a subset of a plurality of resource elements of the first resource;
transmitting, via at least the subset of the plurality of resource elements of the first resource, at least one of the first reference signal or the second reference signal in accordance with the control message; and
receiving at least one measurement report that includes the first channel state information for the half-duplex operations and the second channel state information for the full-duplex operations based at least in part on transmitting at least one of the first reference signal or the second reference signal.

* * * * *